(12) United States Patent
Inoue et al.

(10) Patent No.: US 7,345,976 B2
(45) Date of Patent: Mar. 18, 2008

(54) METHOD FOR RECORDING DATA IN OPTICAL RECORDING MEDIUM, APPARATUS FOR RECORDING DATA IN OPTICAL RECORDING MEDIUM AND OPTICAL RECORDING MEDIUM

(75) Inventors: Hiroyasu Inoue, Tokyo (JP); Tatsuya Kato, Tokyo (JP); Hironori Kakiuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/535,738

(22) PCT Filed: Nov. 19, 2003

(86) PCT No.: PCT/JP03/14712

§ 371 (c)(1),
(2), (4) Date: May 18, 2005

(87) PCT Pub. No.: WO2004/047088

PCT Pub. Date: Jun. 3, 2004

(65) Prior Publication Data

US 2006/0013111 A1    Jan. 19, 2006

(30) Foreign Application Priority Data

Nov. 19, 2002    (JP)    ............................... 2002-334587

(51) Int. Cl.
*G11B 7/00* (2006.01)

(52) U.S. Cl. ................................. 369/59.11; 369/59.12

(58) Field of Classification Search ............. 369/59.11, 369/59.12

See application file for complete search history.

(56) References Cited

U.S. PATENT DOCUMENTS 5,732,062 A * 3/1998 Yokoi et al. ................. 369/116

(Continued)

FOREIGN PATENT DOCUMENTS

JP    07129959    5/1995

(Continued)

OTHER PUBLICATIONS

Narumi, K. et al., "45GB Rewritable Dual-Layer Phase-Change Optical Disk With A Transmittance Balanced Structure", Technical Digest, International Symposium on Optical Memory 2001, Grand Hotel, Taipei, Taiwan, Oct. 16-19, 2001, pp. 202 & 203.

*Primary Examiner*—Wayne Young
*Assistant Examiner*—Linh T. Nguyen
(74) *Attorney, Agent, or Firm*—Seed IP Law Group PLLC

(57) ABSTRACT

A method for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner. The method for recording data in an optical recording medium according to the present invention is adapted for recording data in the optical recording medium including a substrate, a protective layer and a plurality of information recording layers between the substrate and the protective layer by projecting a laser beam onto the plurality of information recording layers via a light incidence plane constituted by either the substrate or the protective layer, thereby recording data in the plurality of information recording layers and the method for recording data in an optical recording medium comprises the steps of projecting a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane and forming a recording mark in the at least one information recording layer other than the information recording layer farthest from the light incidence plane, thereby recording data therein.

20 Claims, 21 Drawing Sheets

U.S. PATENT DOCUMENTS

| | | | |
|---|---|---|---|
| 5,745,467 A | 4/1998 | Sakaue et al. | 369/116 |
| 5,818,808 A | 10/1998 | Takada et al. | 369/116 |
| 5,949,747 A | 9/1999 | Miyashita et al. | 369/54 |
| 6,188,656 B1 | 2/2001 | Shoji et al. | |
| 6,333,913 B1* | 12/2001 | Yoshinari et al. | 369/283 |
| 6,345,026 B1 | 2/2002 | Furukawa et al. | |
| 6,404,712 B1 | 6/2002 | Lee et al. | 369/47.53 |
| 6,404,713 B1 | 6/2002 | Ueki | 369/47.53 |
| 6,426,930 B2* | 7/2002 | Tanaka et al. | 369/59.12 |
| 6,608,806 B2* | 8/2003 | Miyamoto et al. | 369/59.11 |
| 6,611,481 B1 | 8/2003 | Koishi et al. | 369/47.53 |
| 6,631,109 B2* | 10/2003 | Nakamura | 369/59.11 |
| 6,751,513 B1* | 6/2004 | Spruit | 700/94 |
| 6,791,926 B1 | 9/2004 | Furumiya et al. | 369/53.13 |
| 6,982,111 B2 | 1/2006 | Mizushima et al. | 428/64.1 |
| 7,002,887 B2 | 2/2006 | Kakiuchi et al. | 369/59.12 |
| 7,006,419 B2 | 2/2006 | Yokoi | |
| 7,167,431 B2 | 1/2007 | Miura et al. | 369/59.11 |
| 7,263,055 B2* | 8/2007 | Yamada et al. | 369/275.2 |
| 2001/0005343 A1 | 6/2001 | Shoji et al. | 369/47.51 |
| 2001/0017833 A1* | 8/2001 | Yamada et al. | 369/59.11 |
| 2002/0110063 A1* | 8/2002 | Yamada et al. | 369/47.39 |
| 2003/0067856 A1 | 4/2003 | Toda et al. | |
| 2003/0081523 A1* | 5/2003 | Miyagawa et al. | 369/59.11 |
| 2004/0037197 A1 | 2/2004 | Fujiune et al. | |
| 2004/0052176 A1* | 3/2004 | Narumi et al. | 369/47.39 |
| 2005/0243676 A1 | 11/2005 | Kato et al. | 369/59.11 |

FOREIGN PATENT DOCUMENTS

| | | |
|---|---|---|
| JP | 07225947 | 8/1995 |
| JP | 9007176 | 1/1997 |
| JP | 2000276736 | 10/2000 |
| JP | 2001143265 | 5/2001 |
| JP | 2001-222819 | 8/2001 |
| JP | 2001-243655 | 9/2001 |
| JP | 2001243655 A * | 9/2001 |
| JP | 2002015426 | 1/2002 |
| JP | 2002150563 | 5/2002 |
| JP | 2002237037 | 8/2002 |
| JP | 2003-178448 | 6/2003 |
| JP | 2004-87073 | 3/2004 |
| WO | 98/28735 | 7/1998 |

* cited by examiner

METHOD FOR RECORDING DATA IN OPTICAL RECORDING MEDIUM, APPARATUS FOR RECORDING DATA IN OPTICAL RECORDING MEDIUM AND OPTICAL RECORDING MEDIUM

BACKGROUND OF THE INVENTION

1. Field of the Invention

The present invention relates to a method for recording data in an optical recording medium, an apparatus for recording data in an optical recording medium and an optical recording medium and particularly, to a method for recording data in an optical recording medium and an apparatus for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner, and an optical recording medium which includes a plurality of information recording layers and can record data in information recording layers other than an information recording layer farthest from a light incidence plane thereof in a desired manner and reproduce data from information recording layers other than the information recording layer farthest from the light incidence plane in a desired manner.

2. Description of the Related Art

Optical recording media such as the CD, DVD and the like have been widely used as recording media for recording digital data. A need is felt for optical recording media of progressively larger data recording capacity and various proposals is made in order to increase data recording capacity of optical recording media.

This has led to the development of optical recording media having two recording layers and such optical recording media have already been put into practical use as the DVD-Video and the DVD-ROM and other optical recording media adapted to enable only data reading.

An optical recording medium adapted only for reading data and provided with two information recording layers is formed by laminating two substrates each having prepits constituting an information recording layer on the surface thereof, via an intermediate layer.

Further, an optical recording medium having two information recording layers has been recently proposed in connection with optical recording media in which data can be recorded by the user, namely, data rewritable type optical recording media (See Japanese Patent Application Laid Open No. 2001-243655 etc.).

In the optical recording medium disclosed in Japanese Patent Application Laid Open No. 2001-243655, each of the information recording layers is constituted by a phase change type recording film and dielectric films (protective films) formed so as to sandwich the phase change type recording film and the two information recording layers each having such configuration are laminated to each other via an intermediate layer.

In the case where data are to be recorded in an optical recording medium including a plurality of information recording layers in which data can be recorded by the user, a laser beam whose power is modulated to a recording power Pw higher than a reproducing power Pr is focused and projected onto one of the information recording layers and the phase of a recording film contained in the information recording layer irradiated with the laser beam is changed, thereby forming a recording mark in the recording film. Since the reflectivity of a region of the recording film in which the recording mark is formed is different from that of a blank region in which no recording mark is formed, data can be reproduced by projecting a laser beam whose power is set to the reproducing power Pr onto the recording layer and detecting an amount of the laser beam reflected from the recording film.

In the case where data are to be recorded in any one of information recording layers other than an information recording layer closest to a light incidence plane of an optical recording medium including a plurality of information recording layers in which data can be recorded by the user and data recorded in any one of the information recording layers other than the information recording layer closest to the light incidence plane are to be reproduced, a laser beam is projected onto the information recording layer via the information recording layers located closer to the light incidence plane with respect to the information recording layer. Therefore, in order to record data in any one of the information recording layers other than the information recording layer closest to the light incidence plane and reproduce data recorded in any one of the information recording layers other than the information recording layer closest to the light incidence plane in a desired manner, it is necessary for each of the information recording layers located closer to the light incidence plane than information recording layer concerned to have sufficiently high transmittance and it is accordingly usual for each of information layers other than the information recording layer farthest from the incidence plane to have no reflective film or to have only an extremely thin reflective film.

In this manner, in an optical recording medium including a plurality of information recording layers, since information recording layers other than the information recording layer farthest from the incidence plane usually have no reflective film or only an extremely thin reflective film, sufficient enhancement effect cannot be obtained in the information recording layers other than an information recording layer farthest from the incidence plane, unlike in the information recording layer farthest from the incidence plane, and a reproduced signal having a sufficiently high output (modulation) cannot be obtained therefrom.

BRIEF SUMMARY OF THE INVENTION

According to principles of the present invention, a method for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner.

An apparatus for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner is also provided.

As described is an optical recording medium which includes a plurality of information recording layers and can record data in information recording layers other than an information recording layer farthest from a light incidence plane thereof in a desired manner and reproduce data from information recording layers other than the information recording layer farthest from the light incidence plane in a desired manner.

The method for recording data in an optical recording medium wherein the optical recording medium includes a substrate, a protective layer and a plurality of information recording layers between the substrate and the protective layer and a laser beam is projected onto the plurality of information recording layers via a light incidence plane constituted by either the substrate or the protective layer, thereby recording data in the plurality of information recording layers, the method for recording data in an optical recording medium comprising steps of projecting a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane and forming a recording mark in the at least one information recording layer other than the information recording layer farthest from the light incidence plane, thereby recording data therein.

According to the present invention, when a recording mark is to be formed in at least one information recording layer other than an information recording layer farthest from the light incidence plane, thereby recording data therein, since a laser beam whose power is modulated between at least three levels including a level corresponding to a recording power, a level corresponding to an intermediate power lower than the recording power and a level corresponding to a bottom power lower than the intermediate power is projected onto the at least one information recording layer other than the information recording layer farthest from the light incidence plane to form a recording mark therein, thereby recording data therein, it is possible to control in a desired manner the temperature of the at least one information recording layer other than the information recording layer farthest from the light incidence plane when data are to be recorded therein. Therefore, even in the case where the at least one information recording layer other than the information recording layer farthest from the light incidence plane has no reflective film or only has an extremely thin reflective film and the heat radiation characteristic thereof is low, it is possible to form a recording mark and record data in the at least one information recording layer other than the information recording layer farthest from the light incidence plane so that a signal having sufficiently high modulation can be reproduced.

Further, according to the present invention, when a recording mark is to be formed in at least one information recording layer other than an information recording layer farthest from the light incidence plane, thereby recording data therein, since a laser beam whose power is modulated between at least three levels including a level corresponding to a recording power, a level corresponding to an intermediate power lower than the recording power and a level corresponding to a bottom power lower than the intermediate power is projected onto the at least one information recording layer other than the information recording layer farthest from the light incidence plane to form a recording mark therein, thereby recording data therein, even in the case of setting the bottom power to a low level so as to prevent excessive heat from being accumulated in the at least one information recording layer other than the information recording layer farthest from the light incidence plane, it is possible to effectively prevent lowering of the characteristics of a reproduced signal owing to insufficient heat.

In a preferred aspect of the present invention, the level of the bottom power is set so that a region of the at least one information recording layer other than the information recording layer farthest from the light incidence plane heated by irradiation with the laser beam whose power is set to the recording power can be cooled during irradiation with the laser beam whose power is set at the bottom power.

According to this preferred aspect of the present invention, the level of the bottom power is set so that a region of the at least one information recording layer other than the information recording layer farthest from the light incidence plane heated by irradiation with the laser beam whose power is set to the recording power can be cooled during irradiation with the laser beam whose power is set at the bottom power and, therefore, the at least one information recording layer other than the information recording layer farthest from the light incidence plane heated by irradiation with the laser beam whose power is set to the recording power is quickly cooled during irradiation with the laser beam whose power is set at the bottom power and even in the case where the at least one information recording layer other than the information recording layer farthest from the light incidence plane has no reflective film or only has an extremely thin reflective film and the heat radiation characteristic thereof is low, it is possible to effectively prevent excessive heat from being accumulated therein. Therefore, it is possible to form a recording mark and record data in the at least one information recording layer other than the information recording layer farthest from the light incidence plane so that a signal having sufficiently high modulation can be reproduced.

In a further preferred aspect of the present invention, the power of the laser beam is set to the bottom power when it is projected onto the end portion of each of the recording marks.

In a further preferred aspect of the present invention, the power of the laser beam is set to the intermediate power when it is projected onto a region between neighboring recording marks to be formed in the at least one information recording layer other than the information recording layer farthest from the light incidence plane.

In a further preferred aspect of the present invention, the power of the laser beam is modulated so that a time period during which the power of the laser beam is set to the bottom power for forming the end portion of each of the recording marks becomes longer as a linear recording velocity is higher.

In a further preferred aspect of the present invention, data are recorded by employing an objective lens and a laser beam whose numerical aperture NA and wavelength $\lambda$ satisfy $\lambda/NA \leq 640$ nm, and projecting the laser beam onto the optical recording medium via the objective lens.

In a further preferred aspect of the present invention, the protective layer is formed of a light transmissible material and the laser beam is projected onto the plurality of the information recording layers via the protective layer.

One embodiment of the invention is an apparatus for recording data in an optical recording medium wherein the optical recording medium includes a substrate, a protective layer and a plurality of information recording layers between the substrate and the protective layer and a laser beam is projected onto the plurality of information recording layers via a light incidence plane constituted by either the substrate or the protective layer, thereby recording data in the plurality of information recording layers, the apparatus for recording data in an optical recording medium being constituted so as to project a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane and form a recording mark in the at least one information recording layer other than the information recording layer farthest from the light incidence plane, thereby recording data therein.

One embodiment of the invention is an optical recording medium which includes a substrate, a protective layer and a plurality of information recording layers between the substrate and the protective layer and is constituted so that a laser beam is projected onto the plurality of information recording layers via a light incidence plane constituted by either the substrate or the protective layer, thereby recording data in the plurality of information recording layers, the optical recording medium being recorded with data for setting data recording conditions necessary for projecting a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane when a recording mark is to be formed in the at least one information recording layer other than an information recording layer farthest from the light incidence plane, thereby recording data therein.

In the present invention, preferably, the at least one information recording layer other than an information recording layer farthest from the light incidence plane is formed so as to include a first recording film containing at least one element selected from a group consisting of Si, Ge, Sn, Mg, In, Zn, Bi and Al as a primary component and a second recording film provided in the vicinity of the first recording film and containing as a primary component at least one element selected from a group consisting of Cu, Al, Zn, Ti and Ag and different from the element contained in the first recording film as a primary component so that when the laser beam is projected onto the at least one information recording layer other than an information recording layer farthest from the light incidence plane and when the laser beam is projected onto the recording layer, the element contained in the first recording film as a primary component and the element contained in the second recording film as a primary component mixes with each other, thereby forming a recording mark.

In this specification, the statement that a first recording film contains a certain element as a primary component means that the content of the element is maximum among the elements contained in the first recording film, while the statement that the second recording film contains a certain element as a primary component means that the content of the element is maximum among the elements contained in the second recording film.

In a study done by the inventors of the present invention, it was found that in the case where at least one information recording layer other than an information recording layer farthest from the light incidence plane among the plurality of information recording layers was formed so as to include a first recording film containing at least one element selected from a group consisting of Si, Ge, Sn, Mg, In, Zn, Bi and Al as a primary component and a second recording film provided in the vicinity of the first recording film and containing as a primary component at least one element selected from a group consisting of Cu, Al, Zn, Ti and Ag and different from the element contained in the first recording film as a primary component, when data are to be recorded in the at least one information recording layer other than an information recording layer farthest from the light incidence plane, since the element contained in the first recording film as primary component and the element contained in the second recording film as primary component mixed with each other at a region of the recording layer irradiated with the laser beam to form a recording mark and the reflectivity of the region greatly changed, it was possible to record data the recording layer with high sensitivity. Further, the inventors of the present invention made the further discovery that in such a case, the difference in light transmittances for a laser beam having a wavelength of 380 nm to 450 nm between a region where a record mark was formed and a blank region was equal to or lower than 4% and in the case of recording data in the farthest information recording layer from the light incidence plane or reproducing data from the farthest information recording layer from the light incidence plane by irradiating it with a laser beam having a wavelength of 380 nm to 450 nm via the at least one information recording layer, even if a region of the information recording layer through which the laser beam was transmitted contained a boundary between the region where the recording mark is formed and the blank region, it was possible to record data in the farthest information recording layer from the light incidence plane and reproduce data from the farthest information recording layer from the light incidence plane in a desired manner.

In the present invention, it is not absolutely necessary for the second recording film to be in contact with the first recording film and it is sufficient for the second recording film to be so located in the vicinity of the first recording film as to enable formation of a mixed region including the primary component element of the first recording film and the primary component element of the second recording film when the region is irradiated with a laser beam. Further, one or more other layers such as a dielectric layer may be interposed between the first recording film and the second recording film.

In the present invention, it is preferable to form the second recording film so as to be in contact with the first recording film.

In the present invention, the at least one information recording layer other than an information recording layer farthest from the light incidence plane may include one or more recording films containing one element selected from the group consisting of Si, Ge, Sn, Mg, In, Zn, Bi and Al as a primary component or one or more recording films containing as a primary component one element selected from the group consisting of Cu, Al, Zn, Ti and Ag and different from the element contained in the first recording film as a primary component in addition to the first recording film and the second recording film.

Further, in a study done by the inventors of the present invention, it was found that these elements applied only light load to the environment and that a recording film formed using these elements had excellent surface smoothness.

In the present invention, it is preferable for the first recording film to contain Si as a primary component.

In the present invention, it is preferable for the second recording film to contain Cu as a primary component.

The initial recording characteristic can be particularly improved in comparison with conventional optical recording media when the second recording layer containing Cu as a primary component is formed by a gas phase growth process such as a vacuum deposition process or a sputtering process because the surface smoothness thereof becomes very good. Since the recording films of the optical recording medium according to the present invention therefore have excellent surface smoothness, it is possible to markedly improve the recording characteristic when data are recorded by a laser beam having a reduced spot diameter. Moreover, since Cu is quite inexpensive, the cost of the materials used to fabricate the optical recording medium can be minimized.

In the present invention, it is preferable for the second recording film to be added with at least one element selected from a group consisting of Al, Zn, Sn, Mg and Au and different from the element contained in the first recording film as a primary component.

In the case where the at least one element selected from a group consisting of Al, Zn, Sn, Mg and Au and different from the element contained in the first recording film as a primary component is added to the second recording film in this manner, it is possible to markedly improve the stability of the second recording film against oxidation or sulfurization and to effectively prevent degradation of the appearance of the optical recording medium, such as by peeling of the second recording film and the like owing to corrosion of Cu contained in the second recording film as a primary component, and change in the reflectivity of the optical recording medium during long storage.

The above and other objects and features of the present invention will become apparent from the following description made with reference to the accompanying drawings.

DETAILED DESCRIPTION OF THE INVENTION

A preferred embodiment of the present invention will now be described with reference to accompanying drawings.

Figure 1:
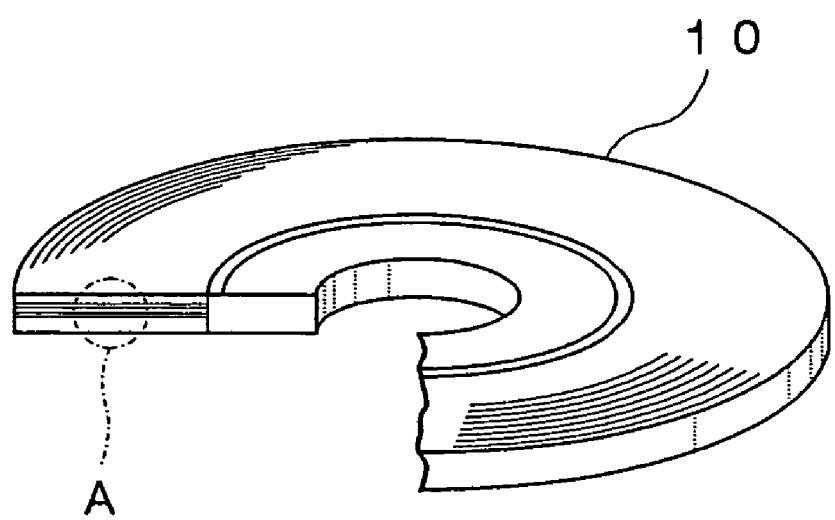
FIG. 1 is a schematic perspective view showing an optical recording medium that is a preferred embodiment of the present invention.
Figure 2:
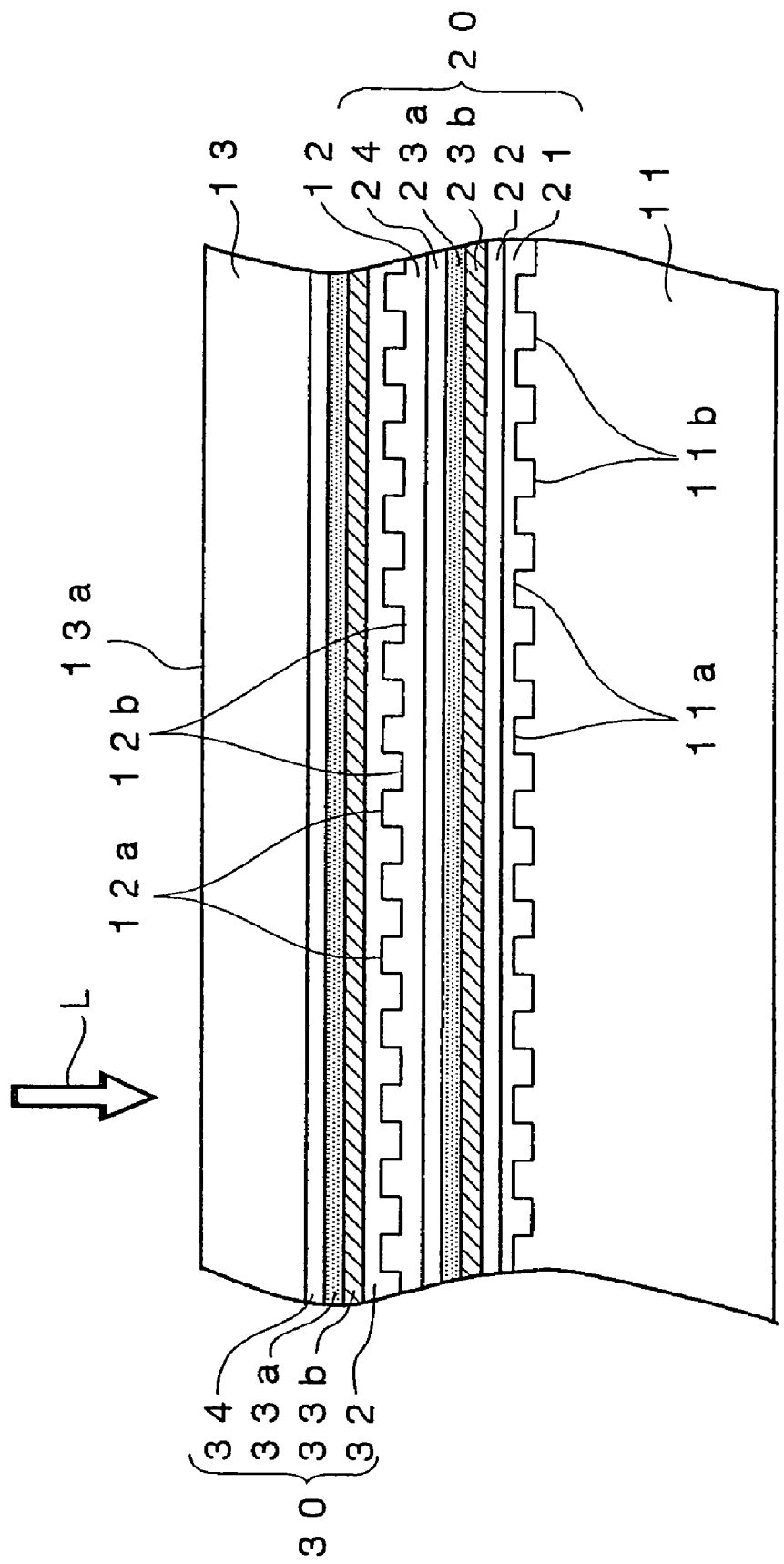
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is an enlarged schematic cross-sectional view of the part of the optical recording medium indicated by A in FIG. 1.

As shown in FIG. 1, an optical recording medium 10 according to this embodiment is disc-like formed and has an outer diameter of about 120 mm and a thickness of about 1.2 mm.

As shown in FIG. 2, the optical recording medium 10 according to this embodiment includes a support substrate 11, a transparent intermediate layer 12, a light transmission layer (protective layer) 13, an L0 layer 20 formed between the support substrate 11 and the transparent intermediate layer 12, and an L1 layer 30 formed between the transparent intermediate layer 12 and the light transmission layer 13.

The L0 layer 20 and the L1 layer 30 are information recording layers in which data are to be recorded and the optical recording medium 10 according to this embodiment includes two information recording layers.

The L0 layer 20 constitutes an information recording layer far from a light incident plane 13a and is constituted by laminating a reflective film 21, a fourth dielectric film 22, a second L0 recording film 23b, a first L0 recording film 23a and a third dielectric film 24 from the side of the support substrate 11.

On the other hand, the L1 layer 30 constitutes an information recording layer close to the light incident plane 13a and is constituted by laminating a second dielectric film 32, a second recording film 33b, a first recording film 33a and a first dielectric film 34 from the side of the support substrate 11.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 13a located opposite to the support substrate 11, it is unnecessary for the support substrate 11 to have a light transmittance property.

As shown in FIG. 2, grooves 11a and lands 11b are alternately and spirally formed on the surface of the support substrate 11. The grooves 11a and/or lands 11b serve as a guide track for the laser beam L when data are to be recorded in the L0 layer 20 or when data are to be reproduced from the L0 layer 20.

The depth of the groove 11a is not particularly limited but it is preferably set to 10 nm to 40 nm. The pitch of the grooves 11a is not particularly limited but it is preferably set to 0.2 μm to 0.4 μm.

The transparent intermediate layer 12 serves to space the L0 layer 20 and the L1 layer 30 apart by a physically and optically sufficient distance.

As shown in FIG. 2, grooves 12a and lands 12b are alternately formed on the surface of the transparent intermediate layer 12. The grooves 12a and/or lands 12b formed on the surface of the transparent intermediate layer 12 serve as a guide track for the laser beam L when data are to be recorded in the L1 layer 30 or when data are to be reproduced from the L0 layer 20.

The depth of the groove 12a and the pitch of the grooves 12a can be set to be substantially the same as those of the grooves 11a formed on the surface of the support substrate 11.

It is preferable to form the transparent intermediate layer 12 so as to have a thickness of 5 μm to 50 μm and it is more preferable to form it so as to have a thickness of 10 μm to 40 μm.

The material for forming the transparent intermediate layer 12 is not particularly limited and an ultraviolet ray curable acrylic resin is preferably used for forming the transparent intermediate layer 12.

It is necessary for the transparent intermediate layer 12 to have sufficiently high light transmittance since the laser beam L passes through the transparent intermediate layer 12 when data are to be recorded in the L0 layer 20 and data are to be reproduced from the L0 layer 20.

The light transmission layer 13 serves to transmit the laser beam L and the light incident plane 13a is constituted by one of the surfaces thereof.

It is preferable to form the light transmission layer 13 so as to have a thickness of 30 μm to 200 μm.

The material for forming the light transmission layer 13 is not particularly limited and an ultraviolet ray curable acrylic resin is preferably used for forming the light transmission layer 13.

The light transmission layer 13 may be formed by bonding a sheet formed of a light transmissible resin onto the surface of the L1 layer 30 using an adhesive agent.

It is necessary for the light transmission layer 13 to have sufficiently high light transmittance since the laser beam L passes through the transparent intermediate layer 13 when data are to be recorded in the optical recording medium 10 and data are to be recorded from the optical recording medium 10.

As shown in FIG. 2, the L1 layer 30 includes the second L1 recording film 33b and the first L1 recording film 33a. The first L1 recording film 33a contains Si as a primary component and the second L1 recording film 33b contains Cu as a primary component.

In order to lower the level of noise of a reproduced signal and improve long-term storage stability of the optical recording medium 10, it is preferable to add one or more elements selected from the group consisting of Al, Zn, Sn, Mg and Au to the second L1 recording film 33b.

Similarly, as shown in FIG. 2, the L0 layer 20 includes the second L0 recording film 23b and the first L0 recording film 23a. The first L0 recording film 23a contains Si as a primary component and the second L0 recording film 23b contains Cu as a primary component.

In order to lower the level of noise of a reproduced signal and improve long-term storage stability of the optical recording medium 10, it is preferable to add one or more elements selected from the group consisting of Al, Zn, Sn, Mg and Au to the second L0 recording film 23b.

Figure 3:
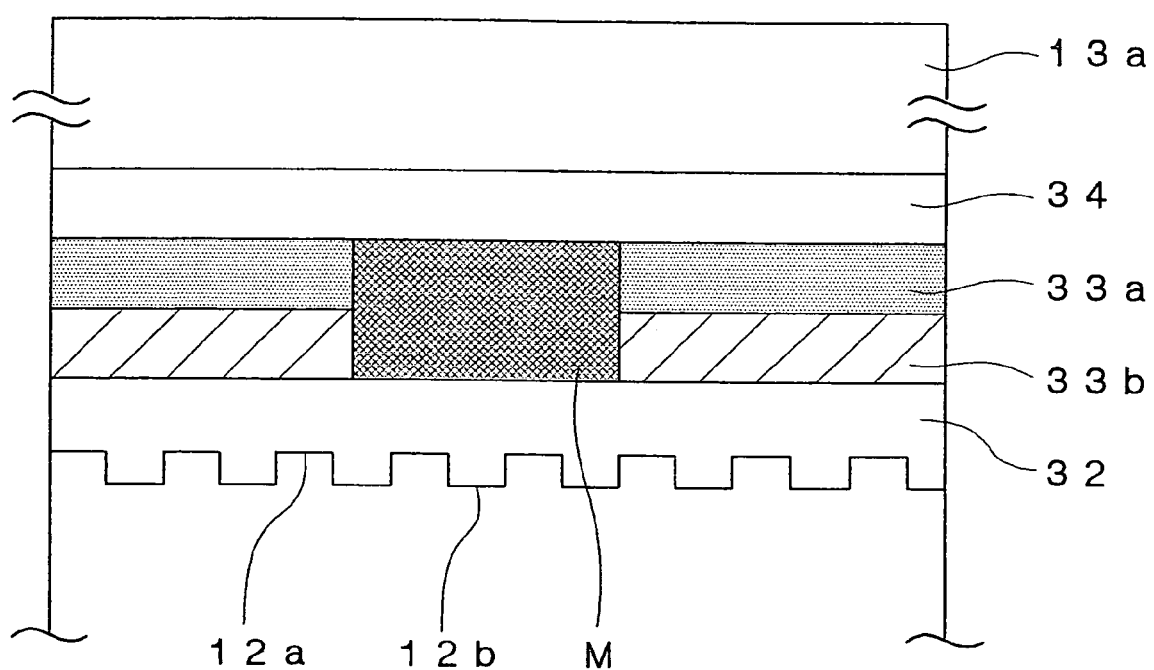
FIG. 3 is a schematic partially enlarged cross-sectional view showing the optical recording medium shown in FIG. 1 after an L1 recording layer was irradiated with a laser beam.

FIG. 3 is a schematic partially enlarged cross-sectional view showing the optical recording medium shown in FIG. 1 after the L1 layer 30 was irradiated with the laser beam L.

As shown in FIG. 3, when the laser beam L is projected onto the L1 layer 30 of the optical recording medium 10 via the light incidence plane 13a, Si contained in the first L1 recording film 33a as a primary component and Cu contained in the second L1 recording film 33b as a primary component quickly fused or diffused and a region M where Si and Cu are mixed is formed, thereby forming a record mark M.

As shown in FIG. 3, when Si contained in the first L1 recording film 33a as a primary component and Cu contained in the second L1 recording film 33b as a primary component are mixed to form a record mark M, the reflection coefficient of a region where the record mark has been formed greatly changes. Therefore, since the reflection coefficient of the region where the record mark is formed is greatly different from that of the region of the L1 layer 30 surrounding the region where the record mark M is formed, it is possible to obtain a high reproduced signal (C/N ratio) by reproducing data recorded in the L1 layer 30.

Figure 4:
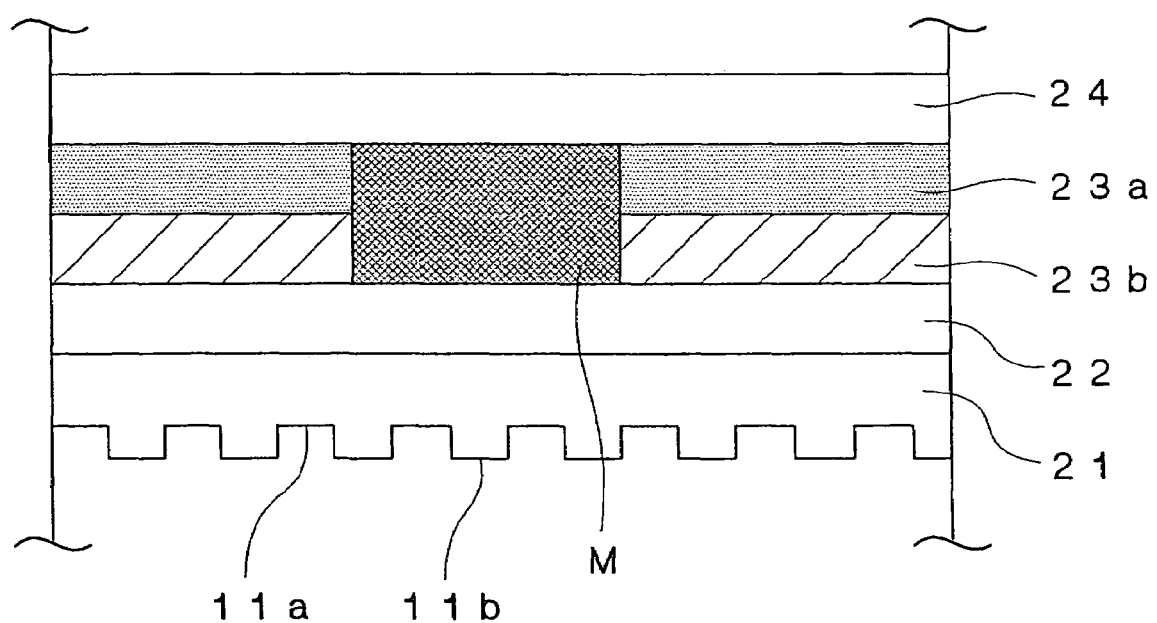
FIG. 4 is a schematic partially enlarged cross-sectional view showing the optical recording medium shown in FIG. 1 after an L0 layer was irradiated with a laser beam.

FIG. 4 is a schematic partially enlarged cross-sectional view showing the optical recording medium shown in FIG. 1 after then L0 layer 20 was irradiated with a laser beam.

When the L0 layer 20 of the optical recording medium 10 is irradiated with a laser beam L via a light incident plane 13a, as shown in FIG. 4, Si contained in the first L0 recording film 23a as a primary component and Cu contained in the second L0 recording film 23b as a primary component are quickly fused or diffused and a region M where Si and Cu are mixed is formed, thereby forming a record mark M.

As shown in FIG. 4, when Si contained in the first L0 recording film 23a as a primary component and Cu contained in the second L0 recording film 23b as a primary component are mixed to form a record mark M, the reflection coefficient of a region where the record mark has been formed greatly changes. Therefore, since the reflection coefficient of the region where the record mark is formed is greatly different from that of the region of the L0 layer 20 surrounding the region where the record mark M is formed, it is possible to obtain a high reproduced signal (C/N ratio) by reproducing data recorded in the L0 layer 20.

Since the laser beam L passes through the L1 layer 30 when data are to be recorded in the L0 layer 20 and when data are to be reproduced from the L0 layer 20, if the difference in light transmittances between a region of the L1 layer 30 where a record mark M is formed and a blank region of the L1 layer 30 where no record mark M is formed is great, when data are to be recorded in the L0 layer 20, the amount of the laser beam L projected onto the L0 layer 20 greatly changes depending upon whether the region of the L1 layer 30 through which the laser beam L passes is a region where a record mark is formed or a blank region and when data are reproduced from the L0 layer 20, the amount of the laser beam L reflected from the L0 layer 20, transmitting through the L1 layer 30 and detected greatly change depending upon whether the region of the L1 layer 30 through which the laser beam L passes is a region where a record mark is formed or a blank region. As a result, the recording characteristics of the L0 layer 20 and the amplitude of a signal reproduced from the L0 layer 20 change greatly depending upon whether the region of the L1 layer 30 through which the laser beam L passes is a region where a record mark M is formed or a blank region.

In particular, when data recorded in the L0 layer 20 are reproduced, if the region of the L1 layer 30 through which the laser beam L passes contains a boundary between a region where a record mark M is formed and a blank region, since the distribution of the reflection coefficient is not uniform at the spot of the laser beam L, data recorded in the L0 layer 20 cannot be reproduced in a desired manner.

In a study done by the inventors of the present invention, it was found that in order to record data in the L0 layer 20 and reproduce data from the L0 layer 20, it was necessary for the difference in light transmittances between a region of the L1 layer 30 where a record mark M was formed and a blank region of the L1 layer 30 to be equal to or lower than 4% and it was preferable for the difference to be equal to or lower than 2%.

The inventors of the present invention further found that the difference in light transmittances for a laser beam having a wavelength of 350 nm to 450 nm between the region of a record mark M formed by mixing Si and Cu and a blank region of the L1 layer 30 formed by laminating the first L1 recording film 33a containing Si as a primary component and the second L1 recording film 33b containing Cu as primary component is equal to or lower than 4% and the difference in light transmittances for a laser beam having a wavelength of about 405 nm between a region of the L1 layer 30 where a record mark M is formed and a blank region of the L1 layer 30 is equal to or lower than 1%.

In this embodiment, the first L1 recording film 33a of the L1 layer 30 contains Si as primary component and the second L1 recording film 33b of the L1 layer 30 contains Cu as primary component so that when laser beam L is projected thereonto via the light transmission layer 13, Si contained in the first L1 recording film 33a as a primary component and Cu contained in the second L1 forming a record mark M. It is therefore possible to record data in the L0 recording layer 20 and reproduce data from the L0 recording layer 20 in a desired manner by projecting a laser beam L onto the L0 layer 20 via the L1 layer 30.

Since the laser beam L passes through the L1 recording layer 30 when data are to be recorded in the L0 layer 20 and data are to be reproduced from the L0 layer 20, it is necessary for the L1 layer 30 to have a high light transmittance and it is therefore preferable to form the L1 layer 30 so as to be thinner than the L0 layer 20.

Concretely, it is preferable to form the L0 layer 20 so that the total thickness of the first L0 recording film 23a and the second L0 recording film 23b becomes 2 nm to 40 nm and it is preferable to form the L1 layer 30 so that the total thickness of the first L1 recording film 33a and the second L1 recording film 33b becomes 2 nm to 15 nm.

In the case where each of the total thickness of the first L0 recording film 23a and the second L0 recording film 23b and the total thickness of the first L1 recording film 33a and the second L1 recording film 33b is thinner than 2 nm, the change in reflection coefficient between before and after irradiation with the laser beam L is small so that a reproduced signal having high strength (C/N ratio) cannot be obtained.

On the other hand, in the case where the total thickness of the first L1 recording film 33a and the second L1 recording film 33b is thicker than 15 nm, the light transmittance of the L1 layer 30 is lowered and the recording characteristic and the reproducing characteristic of the L0 layer 20 are degraded.

Further, in the case where total thickness of the first L0 recording film 23a and the second L0 recording film 23b is thicker than 40 nm, the recording sensitivity of the L0 layer 20 is degraded.

Furthermore, in order to increase the change in reflection coefficient between before and after irradiation with the laser beam L, it is preferable to define the ratio of the thickness of the first L0 recording film 23a included in the L0 layer 20 to the thickness of the second L0 recording film 23b (thickness of the first L0 recording film 23a/thickness of the second L0 recording film 23b) and the ratio of the thickness of the first L1 recording film 33a included in the L1 layer 30 to the thickness of the second L1 recording film 33b (thickness of the first L1 recording film 33a/thickness of the second L1 recording film 33b) to be from 0.2 to 5.0.

The third dielectric film 24 and the fourth dielectric film 22 serve as protective layers for protecting the first L0 recording film 23a and the second L0 recording film 23b and the first dielectric film 34 and the second dielectric film 32 serve as protective layers for protecting the first L1 recording film 33a and the second L1 recording film 33b.

The thickness of each of the third dielectric film 24, the fourth dielectric film 22, the first dielectric film 34 and the second dielectric film 32 is not particularly limited and it preferably has a thickness of 1 nm to 150 nm. In the case where the thickness of each of the third dielectric film 24, the fourth dielectric film 22, the first dielectric film 34 and the second dielectric film 32 is thinner than 1 nm, each of the third dielectric film 24, the fourth dielectric film 22, the first dielectric film 34 and the second dielectric film 32 does not sufficiently serve as a protective layer. On the other hand, in the case where the thickness of each of the third dielectric film 24, the fourth dielectric film 22, the first dielectric film 34 and the second dielectric film 32 is thicker than 150 nm, a long time is required for forming it, thereby lowering the productivity of the optical recording medium 10 and there is some risk of cracking the first L0 recording film 23a and the second L0 recording film 23b of the L0 layer 20 and the first L1 recording film 33a and the second L1 recording film 33 of the L1 layer 30 due to internal stress.

The first dielectric film 24, the second dielectric film 24, the third dielectric film 32 and the fourth dielectric film 34 may have a single-layered structure or may have a multi-layered structure including a plurality of dielectric films.

The material for forming the first dielectric film 22, the second dielectric film 24, the third dielectric film 32 and the fourth dielectric film 34 is not particularly limited but it is preferable to form the first dielectric film 22, the second dielectric film 24, the third dielectric film 32 and the fourth dielectric film 34 of oxide, sulfide or nitride of Al, Si, Ce, Zn, Ta, Ti and the like such as $Al_2O_3$, AlN, $SiO_2$, $Si_3N_4$, $CeO_2$, ZnS, TaO and the like or a combination thereof. In order to improve the heat radiation characteristic of the L1 layer 30 having no reflective film, it is particularly preferable to form the second dielectric film 24, the third dielectric film 32 and the fourth dielectric film 34 of a mixture of ZnS and $SiO_2$ whose mole ratio is 80:20 and to form the first dielectric film 22 of $TiO_2$ having higher thermal conductivity than that of the mixture of ZnS and $SiO_2$.

The reflective film 21 serves to reflect the laser beam L entering the light incident plane 13a so as to emit it from the light transmission layer 13 and effectively radiate heat generated in the first L0 recording film 23a and the second L0 recording film 23b by the irradiation with the laser beam L.

The thickness of the reflective film 21 is not particularly limited but it is preferable to form the reflective film 21 so as to have a thickness of 20 nm to 200 nm. In the case where the thickness of the reflective film 21 is thinner than 20 nm, it is difficult to radiate heat generated in the first L0 recording film 23a and the second L0 recording film 23b in a desired manner and on the other hand, in the case where the thickness of the reflective film 21 is thicker than 200 nm, a long time is required for forming it, thereby lowering the productivity of the optical recording medium 10 and there is some risk of cracking the reflective film 21 due to internal stress.

The material used for forming the reflective film 21 is not particularly limited and the reflective film 21 can be formed of Mg, Al, Ti, Cr, Fe, Co, Ni, Cu, Zn, Ge, Ag, Pt, Au and the like. Among these materials, it is preferable to form the reflective film 21 of a metal material having a high reflection characteristic, such as Al, Au, Ag, Cu or alloy containing at least one of these metals, such as alloy of Al and Ti.

Figure 5:
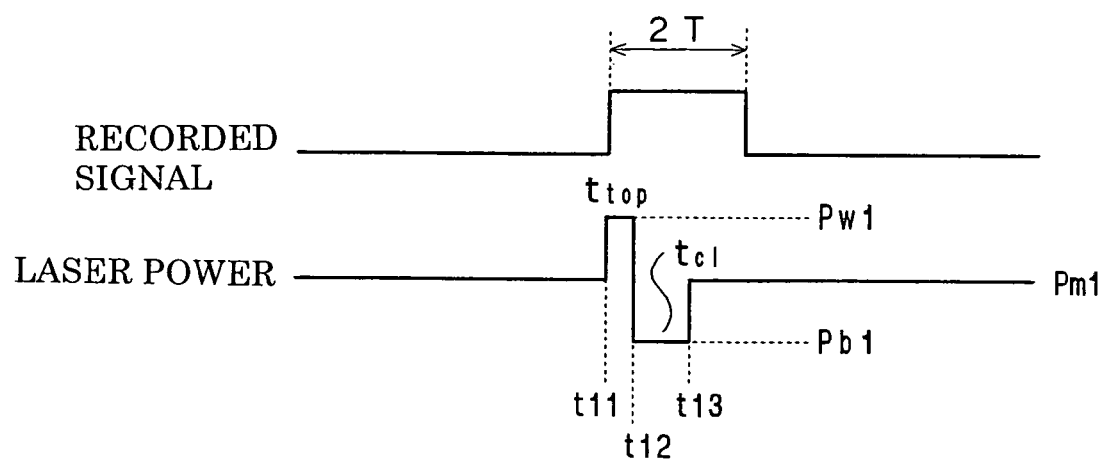
FIG. 5 is a diagram showing the waveform of a first pulse train pattern for modulating the power of a laser beam in the case of recording 2T signals in an L0 layer or an L1 information recording layer of an optical recording medium.
Figure 6:
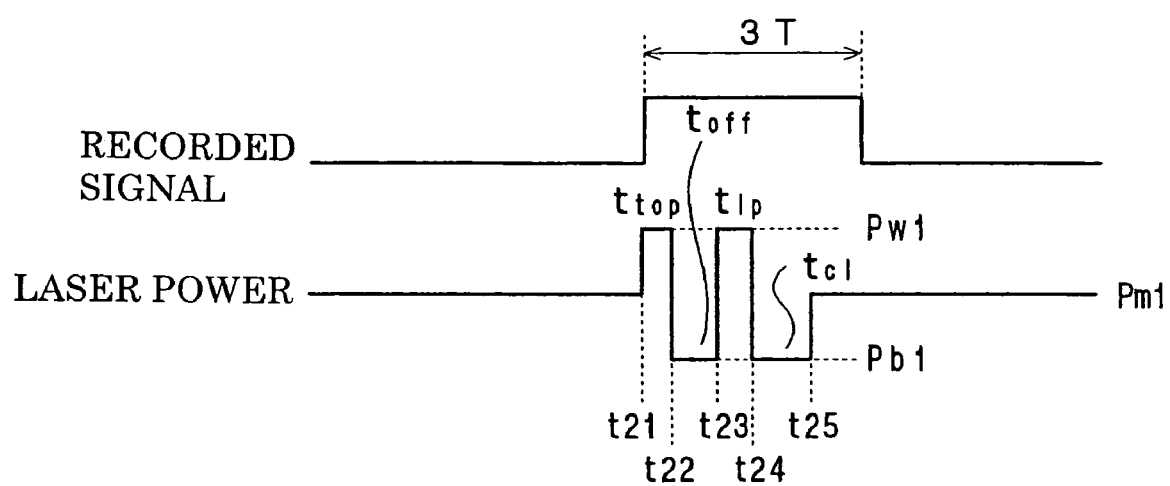
FIG. 6 is a diagram showing the waveform of a first pulse train pattern for modulating the power of a laser beam in the case of recording 3T signals in an L0 layer or an L1 information recording layer of an optical recording medium.
Figure 7:
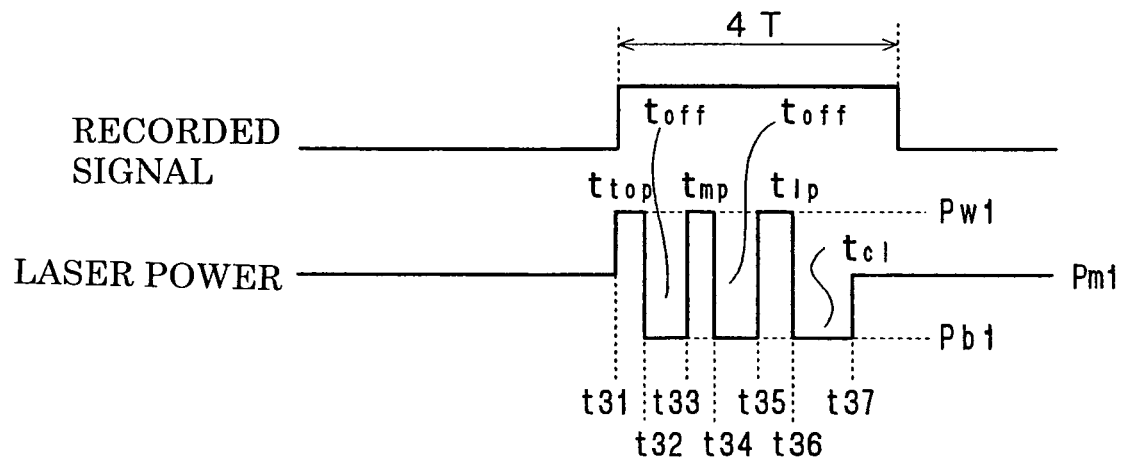
FIG. 7 is a diagram showing the waveform of a first pulse train pattern for modulating the power of a laser beam in the case of recording 4T signals in an L0 layer or an L1 information recording layer of an optical recording medium.
Figure 8:
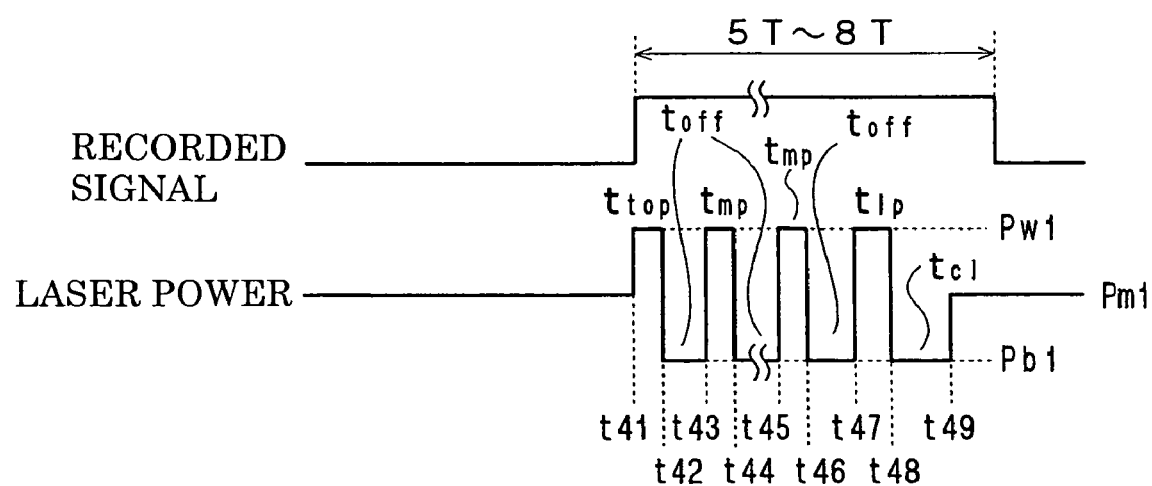
FIG. 8 is a diagram showing the waveform of a first pulse train pattern for modulating the power of a laser beam in the case of recording any one of a 5T signal to an 8T signal in an L0 information recording layer or an L1 layer of an optical recording medium.

Each of FIGS. 5 to 8 is a diagram showing a waveform of a first pulse train pattern used for modulating the power of a laser beam L in the case of projecting the laser beam L onto the L0 layer 20 or the L1 layer 30 of the optical recording medium 10 and recording data therein, wherein FIG. 5 is a diagram showing the waveform of the first pulse train pattern for modulating the power of the laser beam L in the case of recording 2T signals in the L0 layer 20 or the L1 layer 30 using the 1,7RLL Modulation Code, FIG. 6 is a diagram showing the waveform of the first pulse train pattern for modulating the power of the laser beam L in the case of recording 3T signals in the L0 layer 20 or the L1 layer 30 using the 1,7RLL Modulation Code, FIG. 7 is a diagram showing the waveform of the first pulse train pattern for modulating the power of the laser beam L in the case of recording 3T signals in the L0 layer 20 or the L1 layer 30 using the 1,7RLL Modulation Code and FIG. 8 is a diagram showing the waveform of the first pulse train pattern for modulating the power of the laser beam L in the case of recording any one of a 5T signal to an 8T signal in the L0 layer 20 or the L1 layer 30 using the 1,7RLL Modulation Code.

As shown in FIGS. 5 to 8, when the power of the laser beam L is to be modulated using the first pulse train pattern, the power of the laser beam L is modulated between three levels including a level corresponding to a recording power Pw1, a level corresponding to an intermediate power Pm1 lower than the recording power Pw1 and a level corresponding to a bottom power Pb1 lower than the intermediate power Pm1.

Hereinafter, when data are to be recorded in the L0 layer 20 of the optical recording medium 10, the recording power Pw1 of the laser beam L is referred to as Pw10, the intermediate power Pm1 of the laser beam L is referred to as Pm10 and the bottom power Pb1 of the laser beam L is referred to as Pb10. On the other hand, when data are to be recorded in the L1 layer 30 of the optical recording medium 10, the recording power Pw1 of the laser beam L is referred to as Pw11, the intermediate power Pm1 of the laser beam L is referred to as Pm11 and the bottom power Pb1 of the laser beam L is referred to as Pb11.

In this embodiment, the recording power Pw10 is set to such a high level that Si contained in the first L0 recording film 23a as a primary component and Cu contained in the second L0 recording film 23b as a primary component can be heated and mixed to form a record mark M when the laser beam L whose power is set to the recording power Pw10 is projected onto the L0 layer 20. On the other hand, the intermediate power Pm10 is set to such a low level that Si contained in the first L0 recording film 23a as a primary component and Cu contained in the second L0 recording film 23b as a primary component cannot be substantially mixed when the laser beam L whose power is set to the intermediate power Pm10 is projected onto the L0 layer 20.

To the contrary, the bottom power Pb10 is set to such en extremely low level that when the laser beam L whose power is set to the bottom power Pb10 is projected onto the L0 layer 20, regions of the first L0 recording film 23a and the second L0 recording film 23b heated by the irradiation with the laser beam L whose power was set to the recording power Pw10 can be cooled.

Similarly, the recording power Pw11 is set to such a high level that Si contained in the first L1 recording film 33a as a primary component and Cu contained in the second L1 recording film 33b as a primary component can be heated and mixed to form a record mark M when the laser beam L whose power is set to the recording power Pw11 is projected onto the L1 layer 30. On the other hand, the intermediate power Pm11 is set to such a low level that Si contained in the first L1 recording film 33a as a primary component and Cu contained in the second L1 recording film 33b as a primary component cannot be substantially mixed when the laser beam L whose power is set to the intermediate power Pm11 is projected onto the L1 layer 30.

To the contrary, the bottom power Pb11 is set to such en extremely low level that when the laser beam L whose power is set to the bottom power Pb11 is projected onto the L1 layer 30, regions of the first L1 recording film 33a and the second L1 recording film 33b heated by the irradiation with the laser beam L whose power was set to the recording power Pw11 can be cooled.

The relationship between the recording power PW10 and the recording power Pw11 and the relationship between the intermediate power Pm10 and the intermediate power Pm11 are not particularly limited.

Similarly, the relationship between the bottom power Pb10 and the bottom power Pb11 is not particularly limited.

As shown in FIG. 5, when a 2T signal is to be recorded in the L0 layer 20 or the L1 layer 30 of the optical recording medium 10, the number of recording pulses included in the first pulse train, namely, the number of times the level is raised to a level corresponding to the recording power Pw10 or Pw11, is set to be 1.

As shown in FIG. 5, when a 2T signal is to be recorded in the L0 layer 20 or the L1 layer 30 of the optical recording medium 10, the first pulse train pattern includes a recording pulse whose level is set to a level corresponding to the recording power Pw10 or Pw11 and a cooling interval $t_{cl}$ immediately after the recording pulse during which the level is set to the bottom power Pb10 or Pb11.!

More specifically, when a 2T signal is to be recorded in the L0 layer 20 or the L1 layer 30 of the optical recording medium 10, the power of the laser beam L is modulated so that it is held at the intermediate power Pm10 or Pm11 before formation of a recording mark corresponding to a 2T signal, increased from the intermediate power Pm10 or Pm11 to the recording power Pw10 or Pw11 at a time t11, decreased from the recording power Pw10 or Pw11 to the bottom power Pb10 or Pb11 at a time t12 after passage of a predetermined time period $t_{top}$, and increased from the bottom power Pb10 or Pb11 to the intermediate power Pm10 or Pm11 at a time t13 after passage of a predetermined time period $t_{cl}$.

Hereinafter, in the forming of a recording mark, the time period during which the power of the laser beam L is finally decreased from the recording power Pw10 or Pw11 to the bottom power Pb10 or Pb11 and is held at the bottom power Pb10 or Pb11 is referred to as a cooling interval and when a recording mark is to be formed, the time period between when the power of the laser beam L is increased from the intermediate power Pm10 or Pm11 to the recording power Pw10 or Pw11 up to when the cooling interval $t_{cl}$ is started is referred to as a heating interval.

In the case where a 2T signal is to be recorded in the L0 layer 20 or the L1 layer 30 of the optical recording medium 10, the time period from the time t11 to the time t12, namely, the time period $t_{top}$ corresponds to the heating interval and the time period $t_{cl}$ from the time t12 to the time t13 corresponds to the cooling interval.

On the other hand, as shown in FIG. 6, when a 3T signal is to be recorded in the L0 layer 20 or the L1 layer 30 of the optical recording medium 10, the number of recording pulses included in the first pulse train pattern is set to 2 and the first pulse train pattern includes a cooling interval $t_{cl}$ immediately after a second recording pulse during which the level is set to the bottom power Pb10 or Pb11.

More specifically, when a 3T signal is to be recorded in the L0 layer 20 or the L1 layer 30 of the optical recording medium 10, the power of the laser beam L is modulated so that it is held at the intermediate power Pm10 or Pm11 before formation of a recording mark corresponding to a 3T signal, increased from the intermediate power Pm10 or Pm11 to the recording power Pw10 or Pw11 at a time t21, decreased from the recording power Pw10 or Pw11 to the bottom power Pb10 or Pb11 at a time t22 after passage of a predetermined time period $t_{top}$, increased from the bottom power Pb10 or Pb11 to the recording power Pw10 or Pw11 at a time t23 after passage of a predetermined time period $t_{off}$, decreased from the recording power Pw10 or Pw11 to the bottom power Pb10 or Pb11 at a time t24 after passage of a predetermined time period $t_{lp}$, and increased from the bottom power Pb10 or Pb11 to the intermediate power Pm10 or Pm11 at a time t25 after passage of a predetermined time period $t_{cl}$.

Therefore, in the case where a 3T signal is to be recorded in the L0 layer 20 or the L1 layer 30 of the optical recording medium 10, the time period from the time t21 to the time t24, namely, the time period $(t_{top}+t_{off}+t_{lp})$ corresponds to the heating interval and the time period $t_{cl}$ from the time t24 to the time t25 corresponds to the cooling interval.

Further, as shown in FIG. 7, when a 4T signal is to be recorded in the L0 layer 20 or the L1 layer 30 of the optical recording medium 10, the number of recording pulses included in the first pulse train pattern is set to 3 and the first pulse train pattern includes a cooling interval $t_{cl}$ immediately after a third recording pulse during which the level is set to the bottom power Pb10 or Pb11.

More specifically, when a 3T signal is to be recorded in the L0 layer 20 or the L1 layer 30 of the optical recording medium 10, the power of the laser beam L is modulated so that it is held at the intermediate power Pm10 or Pm11 before formation of a recording mark corresponding to a 4T signal, increased from the intermediate power Pm10 or Pm11 to the recording power Pw10 or Pw11 at a time t31, decreased from the recording power Pw10 or Pw11 to the bottom power Pb10 or Pb11 at a time t32 after passage of a predetermined time period $t_{top}$, increased from the bottom power Pb10 or Pb11 to the recording power Pw10 or Pw11 at a time t33 after passage of a predetermined time period $t_{off}$, decreased from the recording power Pw10 or Pw11 to the bottom power Pb10 or Pb11 at a time t34 after passage of a predetermined time period $t_{mp}$, increased from the bottom power Pb10 or Pb11 to the recording power Pw10 or Pw11 at a time t35 after passage of a predetermined time period $t_{off}$ decreased from the recording power Pw10 or Pw11 to the bottom power Pb10 or Pb11 at a time t36 after passage of a predetermined time period $t_{lp}$, and increased from the bottom power Pb10 or Pb11 to the intermediate power Pm10 or Pm11 at a time t37 after passage of a predetermined time period $t_{cl}$.

Therefore, in the case where a 4T signal is to be recorded in the L0 layer 20 or the L1 layer 30 of the optical recording medium 10, the time period from the time t31 to the time t36, namely, the time period $(t_{top}+t_{off}+t_{mp}+t_{off}+t_{lp})$ corresponds to the heating interval and the time period $t_{cl}$ from the time t36 to the time t37 corresponds to the cooling interval.

To the contrary, as shown in FIG. 8, when one among a 5T signal to an 8T signal is to be recorded in the L0 layer 20 or the L1 layer 30 of the optical recording medium 10, the number of recording pulses included in the first pulse train pattern is set to (n−1) where n is an integer from 5 to 8 and the first pulse train pattern includes a cooling interval $t_{cl}$ immediately after an (n−1)th recording pulse during which the level is set to the bottom power Pb10 or Pb11.

More specifically, as shown in FIG. 8, the power of the laser beam L is modulated so that it is held at the intermediate power Pm10 or Pm11 before formation of a recording mark corresponding to one among a 5T signal to an 8T signal, held at the recording power Pw10 or Pw11 during the time period $t_{top}$ from a time t41 to a time t42, the time period $t_{mp}$ from a time t43 to a time t44, the time period $t_{mp}$ from a time t45 to a time t46 and the time period $t_{lp}$ from a time t47 to a time t48, held at the bottom power Pb10 or Pb11 during the time period $t_{off}$ from the time t42 to the time t43, the time period $t_{off}$ from the time t44 to the time t45, the time period $t_{off}$ from the time t46 to the time t47 and the time period $t_{off}$ from the time t48 to a time t49, and increased from the bottom power Pb10 or Pb11 to the intermediate power Pm10 or Pm11 at the time t49.

Therefore, in the case where one among a 5T signal to an 8T signal is to be recorded in the L0 layer 20 or the L1 layer 30 of the optical recording medium 10, the time period from the time t41 to the time t48 corresponds to the heating interval and the time period $t_{cl}$ from the time t48 to the time t49 corresponds to the cooling interval.

As shown in FIGS. 8 to 11, when the power of a laser beam L is to be modulated using the first pulse train pattern and data are to be recorded in the L1 layer 30 of the optical recording medium 10, the power of the laser beam L is modulated to the bottom power Pb11 immediately after it was set to the recording power Pw11 and the bottom power Pb11 is set to such an extremely low level that when the laser beam L whose power is set to the bottom power Pb11 is projected onto the L1 layer 30, regions of the first L1 recording film 33a and the second L1 recording film 33b heated by the irradiation with the laser beam L whose power was set to the recording power Pw11 can be cooled. Therefore, even in the case where data are to be recorded in the L1 layer 30 having no reflective film, the regions of the first L1 recording film 33a and the second L1 recording film 33b heated by the irradiation with the laser beam L whose power was set to the recording power Pw11 is quickly cooled during the irradiation with the laser beam L whose power is set to the bottom power Pb11.

Accordingly, it is possible to prevent excessive heat from being accumulated in the L1 layer 30 and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

On the other hand, since the first pulse train pattern is constituted so as to modulate the power of a laser beam L between three levels including a level corresponding to the recording power Pw10 or Pw11, a level corresponding to the intermediate power Pm10 or Pm11 lower than the recording power Pw10 or Pw11 and a level corresponding to the bottom power Pb10 or Pb11 lower than the intermediate power Pm10 or Pm11 and the L1 layer 30 between neighboring recording marks is irradiated with a laser beam L whose power set to the intermediate power Pm10 or Pm11 higher than the bottom power Pb10 or Pb11, even if the bottom power Pb10 or Pb11 is set to an extremely low level, it is possible to prevent heat supplied to the L0 layer 20 or the L1 layer 30 from becoming insufficient.

Therefore, the first pulse train pattern is preferably used for projecting a laser beam L onto the L1 layer 30 having no reflective film, for forming a recording mark therein and recording data therein.

On the other hand, since the L0 layer 20 is provided with the reflective film 21 and heat generated in the first L0 recording film 23a and the second L0 recording film 23b is quickly radiated by the reflective film 21, it is sufficient to supply such an amount of heat to the L0 layer 20 that the L0 layer 20 can be heated, whereby Si contained in the first L0 recording film 23a as a primary component and Cu contained in the second L0 recording film 23b as a primary component can mix with each other to form a recording mark M and it is therefore possible to form a recording mark M in the L0 layer 20 of the optical recording medium 10 and record data therein by modulating the power of a laser beam L using the first pulse train pattern.

Further, in the first pulse train pattern, it is possible to set the pulse width $t_{top}$ to be constant in each of cases of recording a 2T signal to an 8T signal, set the pulse width $t_{lp}$ to be constant in each of cases of recording a 3T signal to an 8T signal, set the pulse width $t_{mp}$ to be constant in each of cases of recording a 4T signal to an 8T signal, set the pulse width $t_{cl}$ to be constant in each of cases of recording a 2T signal to an 8T signal, and set the pulse width $t_{off}$ to be constant in each of cases of recording a 3T signal to an 8T signal, so that it is possible to simplify the control operation of the power of the laser beam L.

However, in the case where data are to be recorded in the L1 layer 30 of the optical recording medium 10, it is possible to set the cooling interval $t_{cl}$ of the first pulse train pattern to be longer as the linear recording velocity is higher.

When the linear recording velocity becomes higher, the recording sensitivity tends to become lower, so that it is sometimes necessary to prevent the recording sensitivity from becoming lower by lengthening the pulse width $t_{mp}$ or the like. In such a case, if the cooling interval $t_{cl}$ of the first pulse train pattern is set to be longer as the linear recording velocity is higher, it is possible to obtain good recording characteristics while improving the recording sensitivity.

Figure 9:
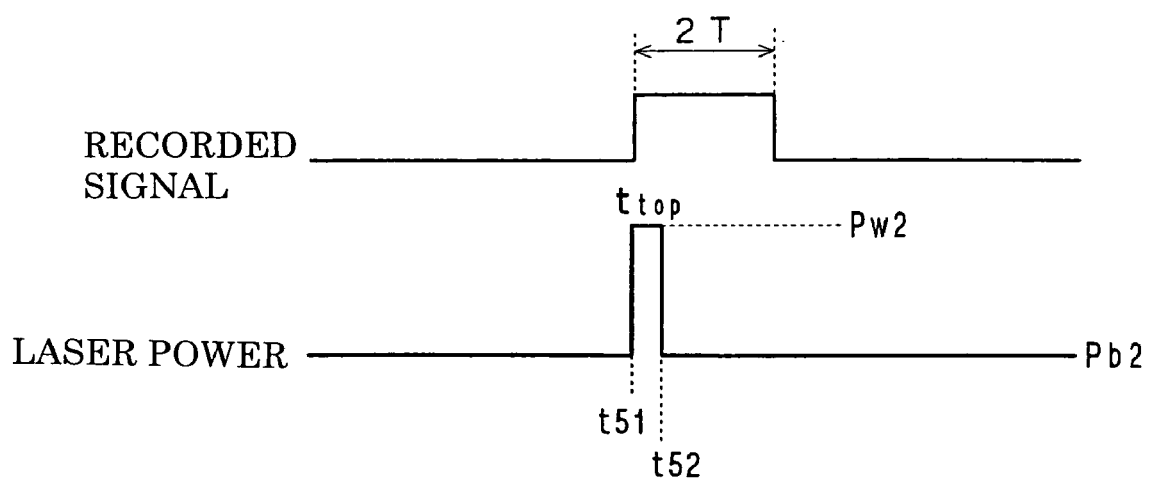
FIG. 9 is a diagram showing the waveform of a second pulse train pattern for modulating the power of a laser beam in the case of recording 2T signals in an L0 layer or an L1 information recording layer of an optical recording medium.
Figure 10:
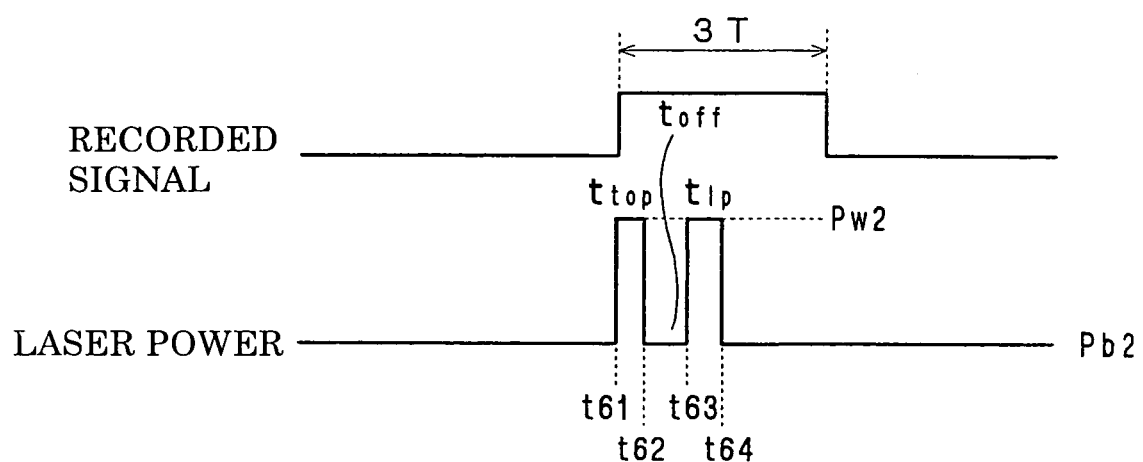
FIG. 10 is a diagram showing the waveform of a second pulse train pattern for modulating the power of a laser beam in the case of recording 3T signals in an L0 layer or an L1 information recording layer of an optical recording medium.
Figure 11:
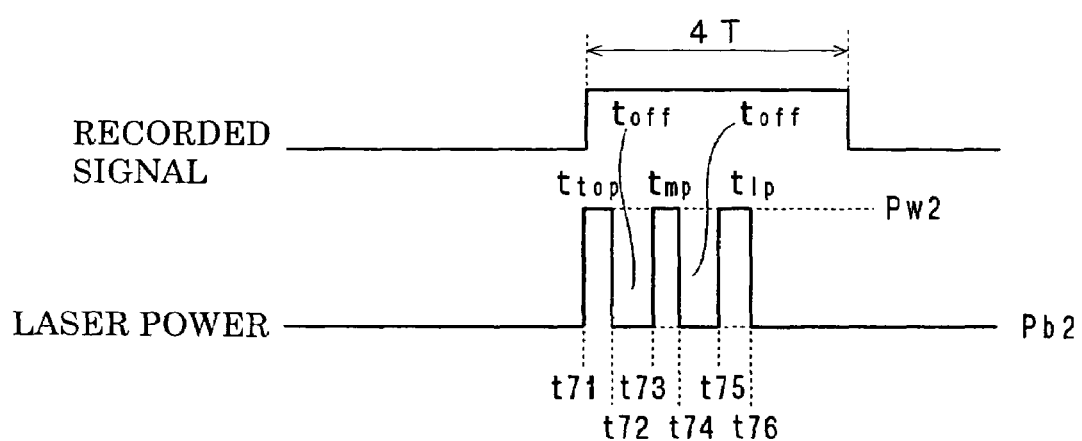
FIG. 11 is a diagram showing the waveform of a second pulse train pattern for modulating the power of a laser beam in the case of recording 4T signals in an L0 layer or an L1 information recording layer of an optical recording medium.
Figure 12:
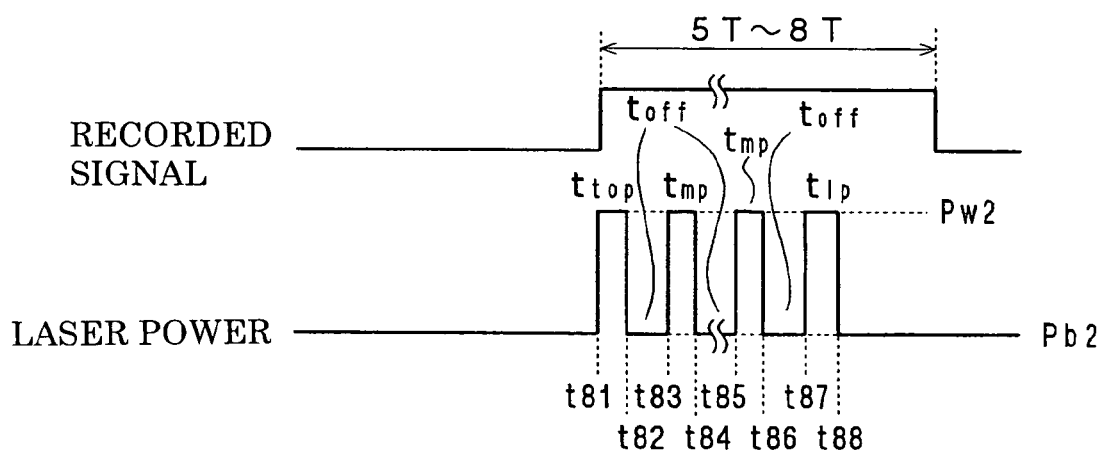
FIG. 12 is a diagram showing the waveform of a second pulse train pattern for modulating the power of a laser beam in the case of recording any one of a 5T signal to an 8T signal in an L0 layer or an L1 information recording layer of an optical recording medium.

Each of FIGS. 9 to 12 is a diagram showing the waveform of a second pulse train pattern used for modulating the power of the laser beam L in the case of projecting the laser beam L onto the L0 layer 20 of the optical recording medium 10 and recording data therein, wherein FIG. 9 is a diagram showing the waveform of a second pulse train pattern for modulating the power of the laser beam L in the case of recording 2T signals in the L0 layer 20 or the L1 layer 30 using the 1,7RLL Modulation Code, FIG. 10 is a diagram showing the waveform of the second pulse train pattern for modulating the power of the laser beam L in the case of recording 3T signals in the L0 layer 20 or the L1 layer 30 using the 1,7RLL Modulation Code, FIG. 11 is a diagram showing the waveform of the second pulse train pattern for modulating the power of the laser beam L in the case of recording 3T signals in the L0 layer 20 or the L1 layer 30 using the 1,7RLL Modulation Code and FIG. 12 is a diagram showing the waveform of the second pulse train pattern for modulating the power of the laser beam L in the case of recording any one of a 5T signal to an 8T signal in the L0 layer 20 or the L1 layer 30 using the 1,7RLL Modulation Code.

As shown in FIGS. 9 to 12, when the power of the laser beam L is to be modulated using the second pulse train pattern, the power of the laser beam L is modulated between two levels including a level corresponding to a recording power Pw2 and a level corresponding to a bottom power Pb2 lower than the recording power Pw2.

The recording power Pw2 is set to such a high level that Si contained in the first L0 recording film 23a as a primary component and Cu contained in the second L0 recording film 23b as a primary component can be heated and mixed to form a record mark M when the laser beam L whose power is set to the recording power Pw2 is projected onto the L0 layer 20. On the other hand, the bottom power Pb2 is set to such a low level that Si contained in the first L0 recording film 23a as a primary component and Cu contained in the second L0 recording film 23b as a primary component cannot be substantially mixed when the laser beam L whose power is set to the intermediate power Pb2 is projected onto the L0 layer 20.

As shown in FIG. 9, when a 2T signal is to be recorded in the L0 layer 20 or the L1 layer 30 of the optical recording medium 10, the number of recording pulses included in the second pulse train includes one recording pulse whose modulation level is set to a level corresponding to the recording power Pw2.

More specifically, when a 2T signal is to be recorded in the L0 layer 20 or the L1 layer 30 of the optical recording medium 10 by modulating the power of the laser beam L using the second pulse train pattern, the power of the laser beam L is modulated so that it is held at the bottom power Pb2 before formation of a recording mark corresponding to a 2T signal, increased from the bottom power Pb2 to the recording power Pw2 at a time t51, and decreased from the recording power Pw2 to the bottom power Pb2 at a time t52 after passage of a predetermined time period $t_{top}$.

On the other hand, as shown in FIG. 10, when a 3T signal is to be recorded in the L0 layer 20 or the L1 layer 30 of the optical recording medium 10, the number of recording pulses included in the second pulse train pattern is set to 2 and the power of the laser beam L is modulated so that it is held at the bottom power Pb2 before formation of a recording mark corresponding to a 3T signal, increased from the bottom power Pb2 to the recording power Pw2 at a time t61, decreased from the recording power Pw2 to the bottom power Pb2 at a time t62 after passage of a predetermined time period $t_{top}$, increased from the bottom power Pb2 to the recording power Pw2 at a time t63 after passage of a predetermined time period $t_{off}$, and decreased from the recording power Pw2 to the bottom power Pb2 at a time t64 after passage of a predetermined time period $t_{lp}$.

Further, as shown in FIG. 11, when a 4T signal is to be recorded in the L0 layer 20 or the L1 layer 30 of the optical recording medium 10, the number of recording pulses included in the second pulse train pattern is set to 3 and the power of the laser beam L is modulated so that it is held at the bottom power Pb2 before formation of a recording mark corresponding to a 4T signal, increased from the bottom power Pb2 to the recording power Pw2 at a time t71, decreased from the recording power Pw2 to the bottom power Pb2 at a time t72 after passage of a predetermined time period $t_{top}$, increased from the bottom power Pb2 to the recording power Pw2 at a time t73 after passage of a predetermined time period $t_{off}$, decreased from the recording power Pw2 to the bottom power Pb2 at a time t74 after passage of a predetermined time period $t_{mp}$, increased from the bottom power Pb2 to the recording power Pw2 at a time t75 after passage of a predetermined time period $t_{off}$, and decreased from the recording power Pw2 to the bottom power Pb2 at a time t76 after passage of a predetermined time period $t_{lp}$.

To the contrary, as shown in FIG. 12, when one among a 5T signal to an 8T signal is to be recorded in the L0 layer 20 or the L1 layer 30 of the optical recording medium 10, the number of recording pulses included in the second pulse train pattern is set to (n−1) where n is an integer from 5 to 8 and the power of the laser beam L is modulated so that it is held at the bottom power Pb2 before formation of a recording mark corresponding to one among a 5T signal to an 8T signal, increased from the bottom power Pb2 to the recording power Pw2 at a time t81, decreased from the recording power Pw2 to the bottom power Pb2 at a time t82 after passage of a predetermined time period $t_{top}$, increased from the bottom power Pb2 to the recording power Pw2 at a time t83 after passage of a predetermined time period $t_{off}$, decreased from the recording power Pw2 to the bottom power Pb2 at a time t84 after passage of a predetermined time period $t_{mp}$, increased from the bottom power Pb2 to the recording power Pw2 at a time t85 after passage of a predetermined time period $t_{off}$, decreased from the recording power Pw2 to the bottom power Pb2 at a time t86 after passage of a predetermined time period $t_{mp}$, increased from the bottom power Pb2 to the recording power Pw2 at a time t87 after passage of a predetermined time period $t_{off}$, and decreased from the recording power Pw2 to the bottom power Pb2 at a time t88 after passage of a predetermined time period $t_{lp}$.

As shown in FIGS. 8 to 12, the second pulse train pattern is constituted so as to modulate the power of the laser beam L between two levels, namely, a level corresponding to the recording power Pw2 and a level corresponding to the bottom power Pb2 lower than the recording power Pw2 and the bottom power Pb2 is set to such a low level that Si contained in the first L0 recording film 23a as a primary component and Cu contained in the second L0 recording film 23b as a primary component cannot be substantially mixed when the laser beam L whose power is set to the intermediate power Pb2 is projected onto the L0 layer 20. Therefore, in the case where the power of the laser beam L is modulated using the second pulse train pattern to form a recording mark in an information recording layer of an optical recording medium, thereby recording data therein, the amount of heat accumulated in the information recording layer becomes larger than that in the case where the power of the laser beam L is modulated using the first pulse train pattern in which the bottom power Pb10 is set to such an extremely low level that that when the laser beam L whose power is set to the bottom power Pb10 is projected onto the L0 layer 20, regions of the first L0 recording film 23a and the second L0 recording film 23b heated by the irradiation with the laser beam L whose power was set to the recording power Pw10 can be cooled and a recording mark is formed in the information recording layer of the optical recording medium, thereby recording data therein.

Therefore, in the case of projecting a laser beam L whose power is modulated using the second pulse train pattern onto the L1 layer 30 of the optical recording medium, forming a recording mark in the L1 layer 30 and recording data therein, since the L1 layer 30 is provided with no reflective film and the heat radiation characteristic of the L1 layer 30 is low, there is a risk of excessive heat being accumulated in the L1 layer 30 and the characteristics of signals obtained by reproducing data recorded in the L1 layer 30 being degraded due to excessive heat accumulated in the L1 layer 30.

To the contrary, in the case of projecting a laser beam L whose power is modulated using the first pulse train pattern onto the L1 layer 30 of the optical recording medium, the power of the laser beam L is modulated to the bottom power Pb11 immediately after it was set to the recording power Pw11 and the bottom power Pb10 or Pb11 is set to such an extremely low level that when the laser beam L whose power is set to the bottom power Pb10 or Pb11 is projected onto the L0 layer 20 or the L1 layer 30, regions of the first L0 recording film 23a and the second L0 recording film 23b or the first L1 recording film 33a and the second L1 recording film 33b heated by the irradiation with the laser beam L whose power was set to the recording power Pw10 or Pw11 can be cooled. Therefore, even in the case where data are to be recorded in the L1 layer 30 having no reflective film, the regions of the first L1 recording film 33a and the second L1 recording film 33b heated by the irradiation with the laser beam L whose power was set to the recording power Pw11 is quickly cooled during the irradiation with the laser beam L whose power is set to the bottom power Pb11. Accordingly, it is possible to prevent excessive heat from being accumulated in the L1 layer 30 and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

Although it is theoretically possible to solve the problem of excessive heat being accumulated in the L1 layer 30 of the optical recording medium 10 when the power of a laser beam L is modulated using the second pulse train pattern and data are to be recorded in the L1 layer 30 by setting the bottom power Pb2 in the second pulse train pattern to a lower level, since the second pulse train pattern is constituted so as to modulate the power of the laser beam L between two levels, namely, a level corresponding to the recording power Pw2 and a level corresponding to the bottom power Pb2 lower than the recording power Pw2, in the case of setting the bottom power Pb2 in the second pulse train pattern to a lower level, heat supplied to the L1 layer 30 becomes insufficient when data are to be recorded, in particular, when a 2T signal is recorded in the L1 layer 30, and characteristics of a reproduced signal is degraded.

To the contrary, in the case of projecting a laser beam L whose power is modulated using the second pulse train pattern onto the L1 layer 30 of the optical recording medium, since the first pulse train pattern is constituted so as to modulate the power of a laser beam L between three levels, namely, a level corresponding to the recording power Pw11, a level corresponding to the intermediate power lower Pm11 than the recording power Pw11 and a level corresponding to the bottom power Pb11 lower than the intermediate power Pm11 and the L1 layer 30 between neighboring recording marks is irradiated with a laser beam L whose power set to the intermediate power Pm11 higher than the bottom power Pb11, even if the bottom power Pb11 is set to an extremely low level, it is possible to prevent heat supplied to the L1 layer 30 from becoming insufficient. Therefore, it is possible to reliably prevent the degradation of characteristics of a reproduced signal caused by the shortage of heat supplied to the L1 layer 30.

Therefore, in the case where a recording mark is to be formed in the L1 layer 30 of the optical recording medium 10 and data are to be recorded therein, the first pulse train is employed and the second pulse train is not used.

To the contrary, since the L0 layer 20 of the optical recording medium 10 is provided with the reflective film 21 and heat generated in the first L0 recording film 23a and the second L0 recording film 23b is quickly radiated by the reflective film 21, it is sufficient to supply such an amount of heat to the L0 layer 20 that the L0 layer 20 can be heated, whereby Si contained in the first L0 recording film 23a as a primary component and Cu contained in the second L0 recording film 23b as a primary component can mix with each other to form a recording mark M and it is therefore possible to use any one of the first pulse train pattern and the second pulse train pattern for forming a recording mark M in the L0 layer 20 of the optical recording medium 10 and recording data therein.

In this embodiment, data for setting data recording conditions, namely, data for setting recording conditions which a data recording apparatus needs to determine a pulse train pattern, are recorded in the optical recording medium 10 in the form of wobbles or pre-pits and, correspondingly, the data recording apparatus stores data for setting data recording conditions and programs for setting data recording conditions which are necessary for determining a pulse train pattern in the above described manner based on the data for setting recording conditions recorded in the optical recording medium 10.

In this embodiment, the optical recording medium 10 is recorded with ID data for identifying the kind of the optical recording medium as the data for setting recording conditions. On the other hand, the data recording apparatus stores programs for setting recording conditions which are necessary for determining a pulse train pattern in the above described manner based on the identified kind of the optical recording medium and is constituted so as to read ID data recorded in the optical recording medium 10, select a program corresponding to the thus read kind of the optical recording medium 10 from among the programs stored therein, determine a pulse train pattern in the above described manner, modulate the power of a laser beam L in accordance with the thus determined pulse train pattern and record data in the optical recording medium 10.

Figure 13:
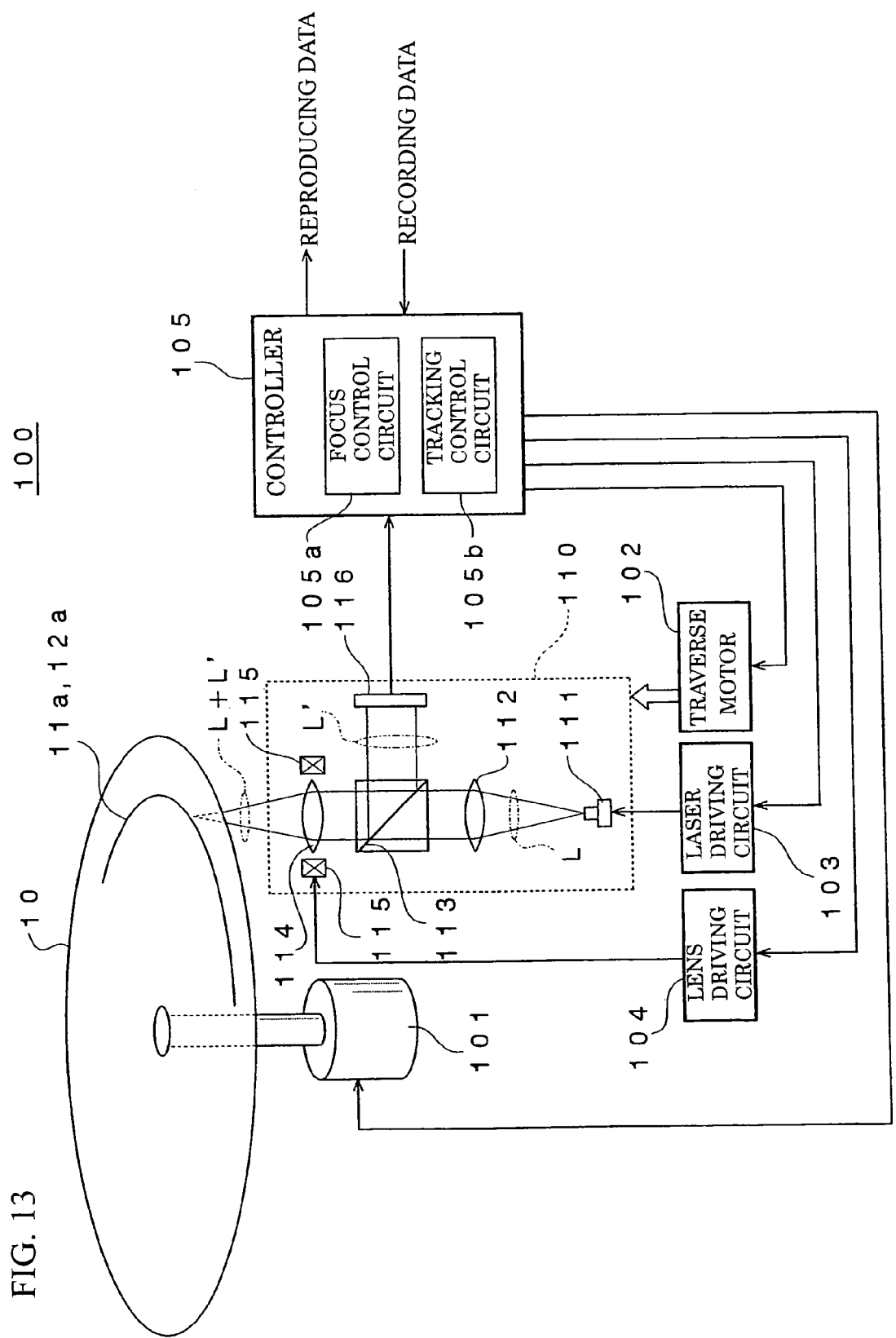
FIG. 13 is a diagram showing a data recording apparatus for recording data in an optical recording medium.

FIG. 13 is a diagram showing the data recording apparatus for recording data in the optical recording medium 10.

As shown in FIG. 13, the data recording apparatus 100 according to this embodiment includes a spindle motor 101 for rotating an optical recording medium 10, an optical head 110 for projecting a laser beam L onto the optical recording medium 10 and receiving a laser beam L reflected by the optical recording medium 10, a traverse motor 102 for moving the optical head 110 in the radial direction of the optical recording medium 10, a laser driving circuit 103 for supplying a laser driving signal to the optical head 110, a lens driving circuit 104 for supplying a lens driving signal to the optical head 110, and a controller 105 for controlling the spindle motor 101, the traverse motor 102, the laser driving circuit 103 and the lens driving circuit 104.

The optical head 110 includes a laser beam source 111 for emitting a laser beam L based on the laser driving signal, a collimator lens 112 for transforming a laser beam L emitted from the laser beam source 111 into a parallel beam, a beam splitter 113 disposed on an optical path of a laser beam L, an objective lens 114 for condensing a laser beam L, an actuator 115 for moving the objective lens 114 in the vertical direction and the horizontal direction based on a lens driving signal and a photo detector 116 for receiving a laser beam L' reflected by the optical recording medium 10 and photo-electrically converting it.

The spindle motor 101 is controlled by the controller 105 in such a manner that the optical recording medium 10 can be rotated with a desired number of revolutions.

Methods for controlling the rotation of an optical recording medium 10 are roughly classified into a CLV method for rotating an optical recording medium 10 at a constant linear velocity and a CAV method for rotating an optical recording medium 10 at a constant angular velocity.

In the case of controlling the rotation of an optical recording medium 10 using the CLV method, since the data transfer rate can be kept constant irrespective of the position of the optical recording medium 10 in which data are being recorded in the radial direction thereof or the position of the optical recording medium 10 from which data are being reproduced in the radial direction thereof, it is possible to always record data in or reproduce data from the optical recording medium at a high data transfer rate and record data therein with high recording density. However, on the other hand, since it is necessary to vary the number of revolutions of the optical recording medium 10 in accordance with the position of the optical recording medium 10 in which data are being recorded in the radial direction thereof or the position of the optical recording medium 10 from which data are being reproduced in the radial direction thereof, the control operation of the spindle motor 101 inevitably becomes complicated, whereby the random access velocity becomes low.

On the other hand, it is advantageous to control the rotation of an optical recording medium 10 using the CAV method in that the spindle motor 101 can be simply controlled and the random access velocity is high but it is disadvantageous in that data recording density at the outer peripheral portion of the optical recording medium 10 becomes relatively low.

The traverse motor 102 is controlled by the controller 105 so as to move the optical head 110 in the radial direction of the optical recording medium 10 and when data are to be recorded in the optical recording medium 10 or when data are to be reproduced from the optical recording medium 10, it drives the optical head 110 so that the spot of the laser beam L is gradually moved along the groove 11b spirally formed on the optical recording medium 10 from the inner circumferential portion of the optical recording medium 10 toward the outer circumferential portion.

Further, when the position of the optical recording medium 10 in which data are being recorded in the radial direction thereof or the position of the optical recording medium 10 from which data are being reproduced in the radial direction thereof is changed, the controller 105 also controls the traverse motor 102 to move the spot of the laser beam L to a desired position on the optical recording medium 10.

The laser driving circuit 103 is controlled by the controller 105 so as to supply a laser driving signal to the laser beam source 111 of the optical head 110 and the laser beam source 111 generates a laser beam L whose power corresponds to the laser driving signal supplied from the laser driving circuit 103.

When data are to be recorded in the L0 layer 20 of the optical recording medium 10, the laser driving circuit 103 generates a laser driving signal whose intensity is modulated so that the power of the laser beam L is modulated in accordance with the first pulse train pattern or the second pulse train pattern and supplies it to the laser beam source 111 of the optical head 110. On the other hand, when data are to be recorded in the L1 layer 30 of the optical recording medium 10, the laser driving circuit 103 generates a laser driving signal whose intensity is modulated so that the power of the laser beam L is modulated in accordance with the first pulse train pattern and supplies it to the laser beam source 111 of the optical head 110.

To the contrary, when data are to be reproduced from the optical recording medium 10, the laser driving circuit 103 generates a laser driving signal having constant intensity and supplies it to the laser beam source 111 of the optical head 110, thereby causing the laser beam source 111 to emit a laser beam L whose power is set a constant reproducing power Pr.

The lens driving circuit 104 is controlled by the controller 105 so as to supply a lens driving signal to the actuator 115.

The controller 105 includes a focus control circuit 105a and when the focus control circuit 105a is turned on, the spot of a laser beam L is focused onto the L0 layer 20 or the L1 layer 30 of the optical recording medium 10 and fixed thereonto. Further, the controller 105 includes a tracking control circuit 105b and when the tracking control circuit 105b is turned on, the spot of a laser beam L automatically follows the groove 11b or the groove 12b of the optical recording medium 10. Therefore, it is possible to correctly focus the spot of a laser beam L onto the L0 layer 20 or the L1 layer 30 of the optical recording medium 10 and cause the spot of a laser beam L to follow the groove 11b or the groove 12b of the optical recording medium 10.

The controller 105 of the data recording apparatus further includes a memory (not shown) and the programs for setting data recording conditions is stored in the memory.

The thus constituted data recording apparatus records data in the optical recording medium 10 in the following manner.

The controller 105 first causes the laser driving circuit 103 to output a laser driving signal to the laser beam source 111.

As a result, a laser beam L is emitted from the laser beam source 111 and the laser beam L emitted from the laser beam source 111 enters the collimator lens 112, thereby being transformed into a parallel beam.

The laser beam L then enters the objective lens 114 via the beam splitter 113 and is condensed onto the groove 11b or the groove 12b formed on the optical recording medium 10.

When data are to be recorded in the optical recording medium 10, the controller 105 reads ID data adapted for identifying the kind of the optical recording medium 10 and recorded in the optical recording medium 10 as the data for setting data recording conditions, reads a program for setting data recording conditions corresponding to the thus read kind of the optical recording medium 10 from among the programs for setting data recording conditions stored in the memory, determines data recording conditions, namely, a pulse train pattern in accordance with the thus read program for setting data recording conditions, and causes the laser driving circuit 103 to output a laser driving signal whose intensity is modulated in accordance with the thus determined pulse train pattern to the laser beam source 111, thereby modulating the power of the laser beam L emitted from the laser beam source 111 and recording data in the optical recording medium 10.

To the contrary, when data recorded in the optical recording medium 10 are to be reproduced, the controller 105 causes the laser driving circuit 103 to output a laser driving signal having constant intensity to the laser beam source 111 and causes the laser beam source 111 to emit a laser beam L whose power is set to a reproducing power Pr having a predetermined level.

The laser beam L emitted from the laser beam source 111 is projected onto the L0 layer 20 or the L1 layer 30 of the optical recording medium 10 and reflected from the L0 layer 20 or the L1 layer 30 of the optical recording medium 10.

The laser beam L' reflected by the L0 layer 20 or the L1 layer 30 of the optical recording medium 10 is transformed by the objective lens 114 into a parallel beam and reflected by the beam splitter 113.

The laser beam L' reflected by the beam splitter 113 is impinged onto the photo detector 116 and photo-electrically detected by the photo detector 116 to produce data and the thus produced data are output to the controller 105.

According to the above described embodiment, in the case of modulating the power of a laser beam L using the first pulse train pattern and recording data in the L1 layer 30 of the optical recording medium 10, since the power of the laser beam L is modulated to the bottom power Pb11 immediately after it was set to the recording power pw11 and the bottom power Pb11 is set to such an extremely low level that when the laser beam L whose power is set to the bottom power Pb11 is projected onto the L1 layer 30, regions of the first L1 recording film 33a and the second L1 recording film 33b heated by the irradiation with the laser beam L whose power was set to the recording power Pw11 can be cooled, even in the case where data are to be recorded in the L1 layer 30 having no reflective film, the regions of the first L1 recording film 33a and the second L1 recording film 33b heated by the irradiation with the laser beam L whose power is set to the recording power Pw11 is quickly cooled during the irradiation with the laser beam L whose power is set to the bottom power Pb11. Accordingly, it is possible to prevent excessive heat from being accumulated in the L1 layer 30 and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

Further, according to the above described embodiment, the first pulse train pattern is constituted so as to modulate the power of the laser beam L between three levels including a level corresponding to the recording power Pw10 or Pw11, a level corresponding to the intermediate power Pm10 or Pm11 lower than the recording power Pw10 or Pw11 and a level corresponding to the bottom power Pb10 or Pb11 lower than the intermediate power Pm10 or Pm11 and the L1 layer 30 between neighboring recording marks is irradiated with a laser beam L whose power is set to the intermediate power Pm10 or Pm11 higher than the bottom power Pb10 or Pb11, and, therefore, even if the bottom power Pb10 or Pb11 is set to an extremely low level, it is possible to prevent heat supplied to the L0 layer 20 or the L1 layer 30 from becoming insufficient. Therefore, even in the case where the L1 layer 30 of the optical recording medium 10 is provided with no reflective film, it is possible to record data in the L1 layer 30 of the optical recording medium 10 in a desired manner by modulating the power of the laser beam L using the first pulse train pattern.

Hereinafter, working examples will be set out in order to further clarify the advantages of the present invention.

WORKING EXAMPLE 1

An optical recording medium sample #1 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 µm.

Then, the polycarbonate substrate was set on a sputtering apparatus and a reflective film consisting of an alloy of Ag, Pd and Cu and having a thickness of 100 nm, a fourth dielectric film containing a mixture of ZnS and $SiO_2$ and having a thickness of 27 nm, a second L0 recording film containing Cu as a primary component, 23 atomic % of Al and 13 atomic % of Au as additives and having a thickness of 5 nm, a first L0 recording film containing Si as a primary component and having a thickness of 5 nm and a third dielectric film containing the mixture of ZnS and $SiO_2$ and having a thickness of 25 nm were sequentially formed on the surface of the polycarbonate substrate on which the grooves and lands were formed, using the sputtering process, thereby forming an L0 layer on the surface of the polycarbonate substrate.

The mole ratio of ZnS to $SiO_2$ in the mixture of ZnS and $SiO_2$ contained in the third dielectric layer and the fourth dielectric layer was 80:20.

Further, the polycarbonate substrate formed with the L0 layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 20 µm and formed with grooves and lands on the surface thereof so that the track pitch (groove pitch) was equal to 0.32 µm was formed by removing the stamper.

Then, the polycarbonate substrate formed with the L0 layer and the transparent intermediate layer on the surface thereof was set on the sputtering apparatus and a second dielectric film containing a mixture of ZnS and $SiO_2$ and having a thickness of 25 nm, a second L1 recording film containing Cu as a primary component, 23 atomic % of Al and 13 atomic % of Au as additives and having a thickness of 5 nm, a first L1 recording film containing Si as a primary component and having a thickness of 5 nm and a first dielectric film containing $TiO_2$ as a primary component and having a thickness of 30 nm were sequentially formed on the surface of the transparent intermediate layer formed on the L0 layer using the sputtering process, thereby forming an L1 layer on the surface of the transparent intermediate layer.

The mole ratio of ZnS to $SiO_2$ in the mixture of ZnS and $SiO_2$ contained in the second dielectric layer was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 80 µm. Thus, the optical recording medium sample #1 was fabricated.

The thus fabricated optical recording medium sample #1 was set in an optical recording medium evaluation apparatus "DDU1000" (Product Name) manufactured by Pulstec Industrial Co., Ltd. and a laser beam having a wavelength λ of 405 nm was focused onto the L1 layer using an objective lens whose numerical aperture was 0.85 via the light transmission layer while the optical recording medium sample # 1 was rotated at a linear velocity of 5.3 m/sec, thereby recording a 2T signal and an 8T signal in the L1 layer of the optical recording medium sample # 1. Here, the power of the laser beam was modulated using the first pulse train pattern.

The pulse widths of the first pulse train pattern were set so that $t_{top}$ was equal to 0.5T, each of $t_{mp}$ and $t_{lp}$ was equal to 0.4T and $t_{cl}$ was equal to 1.2T.

The intermediate power Pm of the laser beam was fixed at 2.4 mW and the bottom power thereof was fixed at 0.1 mW while the recording power of the laser beam Pw was varied.

Then, the 2T signal and the 8T signal recorded in the L1 layer of the optical recording medium sample # 1 were reproduced using the above mentioned optical recording medium evaluation apparatus and the C/N ratios of the reproduced signals were measured. Here, the power of the laser beam was set to 0.7 mW.

Figure 14:
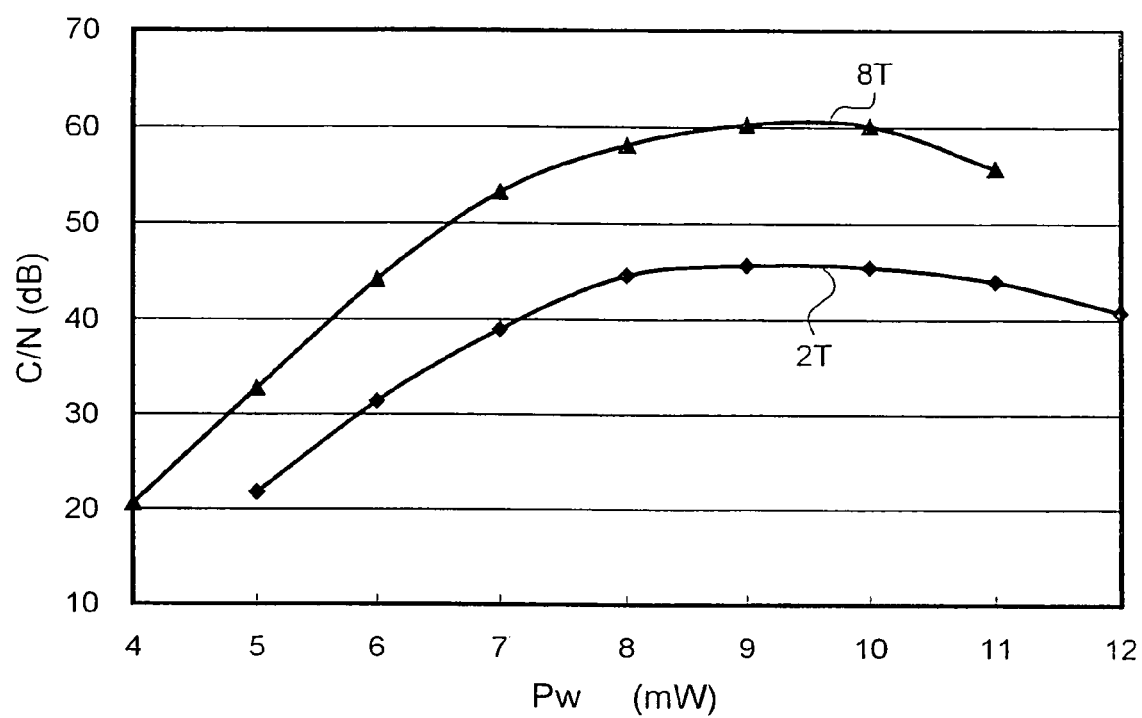
FIG. 14 is a graph showing the results of measuring the relationship between the C/N ratio of a reproduced signal obtained by reproducing a 2T signal and an 8T signal recorded in an L1 layer of an optical recording medium sample #1 and a recording power in Working Example 1.

The results of the measurement are shown in FIG. 14.

As shown in FIG. 14, the recording power Pw of the laser beam at which the C/N ratio of the 2T signal was maximum and the recording power Pw of the laser beam at which the C/N ratio of the 8T signal was maximum were both 9 mW.

The maximum value of the C/N ratio of the 2T signal was 45.7 dB and the maximum value of the C/N ratio of the 8T signal was 60.3 dB, and it was found that signals having sufficiently high C/N ratios could be reproduced.

On the other hand, the recording power Pw of the laser beam at which clock jitter of the reproduced 2T signal was minimum and the recording power Pw of the laser beam at which clock jitter of the reproduced 8T signal was minimum were measured. As a result, it was found that each of them was 8.6 mW and the minimum value of clock jitter was 5.3%, and it was found that clock jitter of the reproduced 2T signal and 8T signal was extremely low.

Here, the fluctuation a of a reproduced signal was measured using a time interval analyzer and the clock jitter was calculated as σ/Tw, where Tw was one clock period.

Comparative Example 1

The optical recording medium sample # 1 was set in the optical recording medium evaluation apparatus "DDU1000" (Product Name) manufactured by Pulstec Industrial Co., Ltd. and a laser beam having a wavelength λ of 405 nm was focused onto the L1 layer using an objective lens whose numerical aperture was 0.85 via the light transmission layer while the optical recording medium sample # 1 was rotated at a linear velocity of 5.3 m/sec, thereby recording a 2T signal and an 8T signal in the L1 layer of the optical recording medium sample # 1. Here, the power of the laser beam was modulated using the second pulse train pattern.

The pulse widths of the first pulse train pattern were set so that $t_{top}$ was equal to 0.5T and each of $t_{mp}$ and $t_{lp}$ was equal to 0.4T.

The bottom power thereof was fixed at 0.1 mW while the recording power of the laser beam Pw was varied.

Then, the 2T signal and the 8T signal recorded in the L1 layer of the optical recording medium sample # 1 were reproduced using the above mentioned optical recording medium evaluation apparatus and the C/N ratios of the reproduced signals were measured. Here, the power of the laser beam was set to 0.7 mW.

Figure 15:
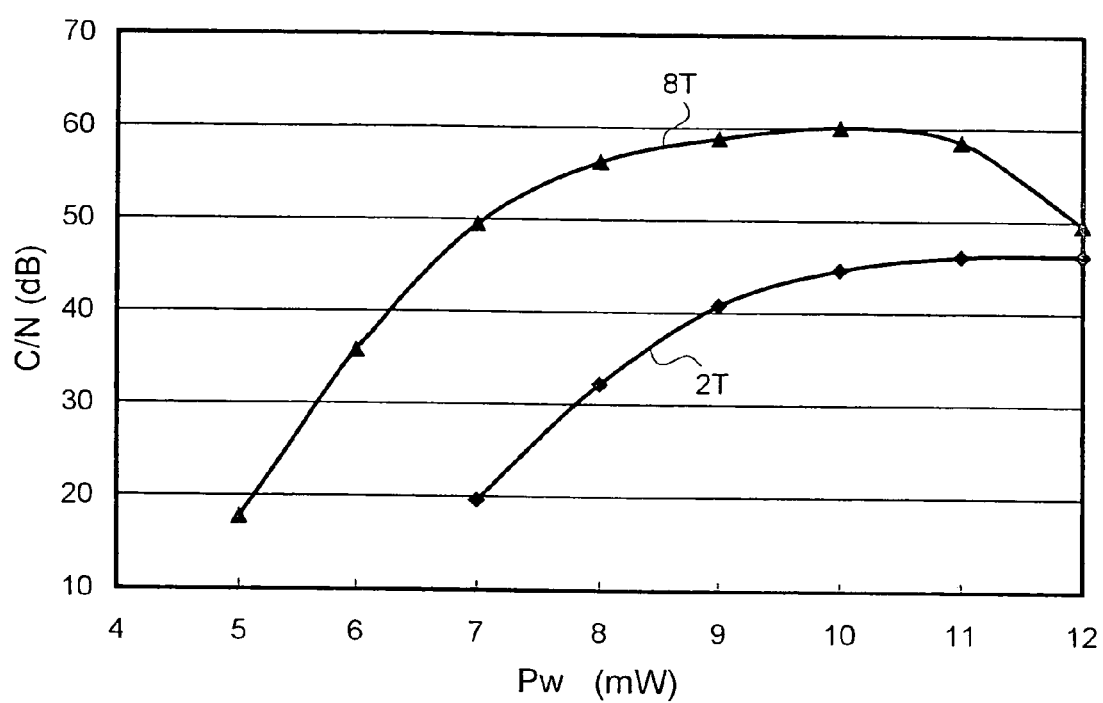
FIG. 15 is a graph showing the results of measuring the relationship between the C/N ratio of a reproduced signal obtained by reproducing a 2T signal and an 8T signal recorded in an L1 layer of an optical recording medium sample #1 and a recording power in Comparative Example 1.

The results of the measurement are shown in FIG. 15.

As shown in FIG. 15, the recording power Pw of the laser beam at which the C/N ratio of the 2T signal was maximum was 12 mW while the recording power Pw of the laser beam at which the C/N ratio of the 8T signal was maximum was 10 mW and they did not coincide with each other.

Further, it was found that the C/N ratio of the 2T signal obtained when the recording power Pw was set to 10 mW was 44.7 dB and that the C/N ratio of the 8T signal obtained when the recording power Pw was set to 10 mW was 60.1 dB.

On the other hand, it was found that the C/N ratio of the 2T signal obtained when the recording power Pw was set to 12 mW was 46.3 dB and that the C/N ratio of the 8T signal obtained when the recording power Pw was set to 12 mW was 49.6 dB.

Therefore, it was found that the difference between the C/N ratio of the 2T signal obtained when the recording power Pw was set to 12 mW and the C/N ratio of the 2T signal obtained when the recording power Pw was set to 10 mW was 1.6 dB, while the difference between the C/N ratio of the 8T signal obtained when the recording power Pw was set to 12 mW and the C/N ratio of the 8T signal obtained when the recording power Pw was set to 10 mW was 10.5 dB and the latter was very large.

Furthermore, the recording power Pw of the laser beam at which clock jitter of the reproduced 2T signal was minimum and the recording power Pw of the laser beam at which clock jitter of the reproduced 8T signal was minimum were measured. As a result, it was found that each of them was 10.2 mW and the minimum value of clock jitter was 13.5% and it was found that clock jitter of both the reproduced 2T signal and 8T signal became markedly lower than that in Working Example 1.

Comparative Example2

The optical recording medium sample # 1 was set in the optical recording medium evaluation apparatus "DDU1000" (Product Name) manufactured by Pulstec Industrial Co., Ltd. Then, similarly to in Comparative Example 1, except that a bottom power Pb of the laser beam was fixed at 1.2 mW, a 2T signal and an 8T signal were recorded in the L1 layer of the optical recording medium sample # 1 and the 2T signal and the 8T signal were reproduced to measure the C/N ratios of the reproduced signals.

Figure 16:
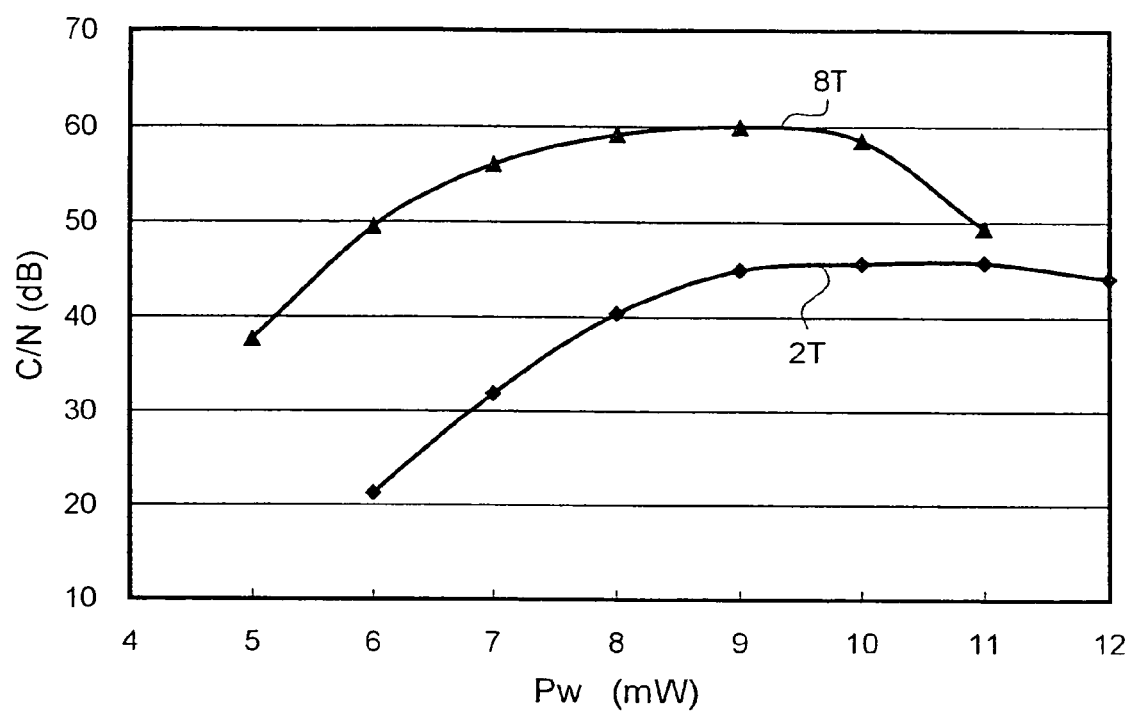
FIG. 16 is a graph showing the results of measuring the relationship between the C/N ratio of a reproduced signal obtained by reproducing a 2T signal and an 8T signal recorded in an L1 layer of an optical recording medium sample #1 and a recording power in Comparative Example 2.

The results of the measurement are shown in FIG. 16.

As shown in FIG. 16, the recording power Pw of the laser beam at which the C/N ratio of the 2T signal was maximum was 11 mW while the recording power Pw of the laser beam at which the C/N ratio of the 8T signal was maximum was 9 mW and they did not coincide with each other.

Further, it was found that the C/N ratio of the 2T signal obtained when the recording power Pw was set to 9 mW was 45.0 dB and that the C/N ratio of the 8T signal obtained when the recording power Pw was set to 9 mW was 60.0 dB.

On the other hand, it was found that the C/N ratio of the 2T signal obtained when the recording power Pw was set to 11 mW was 45.8 dB and that the C/N ratio of the 8T signal obtained when the recording power Pw was set to 11 mW was 49.4 dB.

Therefore, it was found that the difference between the C/N ratio of the 2T signal obtained when the recording power Pw was set to 9 mW and the C/N ratio of the 2T signal obtained when the recording power Pw was set to 9 mW was 0.8 dB, while the difference between the C/N ratio of the 8T signal obtained when the recording power Pw was set to 11 mW and the C/N ratio of the 8T signal obtained when the recording power Pw was set to 11 mW was 10.6 dB and the latter was very large.

Furthermore, the recording power Pw of the laser beam at which clock jitter of the reproduced 2T signal was minimum and the recording power Pw of the laser beam at which clock jitter of the reproduced 8T signal was minimum were measured. As a result, it was found that each of them was 9.4 mW and the minimum value of clock jitter was 14.3% and that clock jitter of both the reproduced 2T signal and 8T signal became markedly lower than that in Working Example 1.

Comparative Example3

The optical recording medium sample #1 was set in the optical recording medium evaluation apparatus "DDU1000" (Product Name) manufactured by Pulstec Industrial Co., Ltd. Then, similarly to in Comparative Example 1, except that the bottom power Pb of the laser beam was fixed at 2.4 mW, a 2T signal and an 8T signal were recorded in the L1 layer of the optical recording medium sample #1 and the 2T signal and the 8T signal were reproduced to measure the C/N ratios of the reproduced signals.

Figure 17:
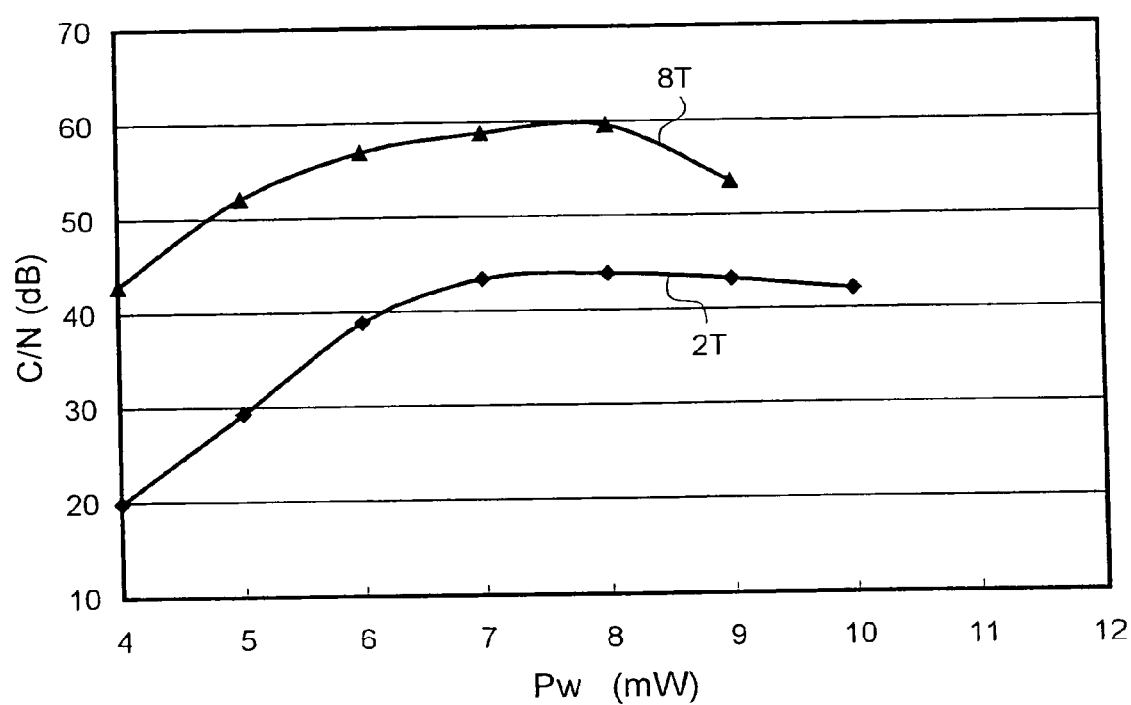
FIG. 17 is a graph showing the results of measuring the relationship between the C/N ratio of a reproduced signal obtained by reproducing a 2T signal and an 8T signal recorded in an L1 layer of an optical recording medium sample #1 and a recording power in Comparative Example 3.

The results of the measurement are shown in FIG. 17.

As shown in FIG. 17, the recording power Pw of the laser beam at which the C/N ratio of the 2T signal was maximum and the recording power Pw of the laser beam at which the C/N ratio of the 8T signal was maximum were both 8 mW.

However, it was found that the maximum value of the C/N ratio of the 2T signal was 43.9 dB and the maximum value of the C/N ratio of the 8T signal was 59.6 dB and that the C/N ratios of the reproduced signals were markedly lower than those in Working Example 1.

Further, the recording power Pw of the laser beam at which clock jitter of the reproduced 2T signal was minimum and the recording power Pw of the laser beam at which clock jitter of the reproduced 8T signal was minimum were measured. As a result, it was found that each of them was 7.0 mW and the minimum value of clock jitter was 15.0% and that clock jitter of both the reproduced 2T signal and 8T signal became markedly lower than that in Working Example 1.

WORKING EXAMPLE 2

The optical recording medium sample #1 was set in the optical recording medium evaluation apparatus "DDU1000" (Product Name) manufactured by Pulstec Industrial Co., Ltd. and a laser beam having a wavelength λ of 405 nm was focused onto the L0 layer using an objective lens whose numerical aperture was 0.85 via the light transmission layer while the optical recording medium sample #1 was rotated at a linear velocity of 5.3 m/sec, thereby recording a 2T signal and an 8T signal in the L0 layer of the optical recording medium sample #1. Here, the power of the laser beam was modulated using the first pulse train pattern.

The pulse widths of the first pulse train pattern were set so that $t_{top}$ was equal to 0.7T, each of $t_{mp}$ and $t_{lp}$ was equal to 0.5T and $t_{cl}$ was equal to 1.0T.

The intermediate power Pm of the laser beam was fixed at 2.0 mW and the bottom power thereof was fixed at 0.1 mW while the recording power of the laser beam Pw was varied.

Then, the 2T signal and the 8T signal recorded in the L0 layer of the optical recording medium sample #1 were reproduced using the above mentioned optical recording medium evaluation apparatus and the C/N ratios of the reproduced signals were measured. Here, the power of the laser beam was set to 0.7 mW.

Figure 18:
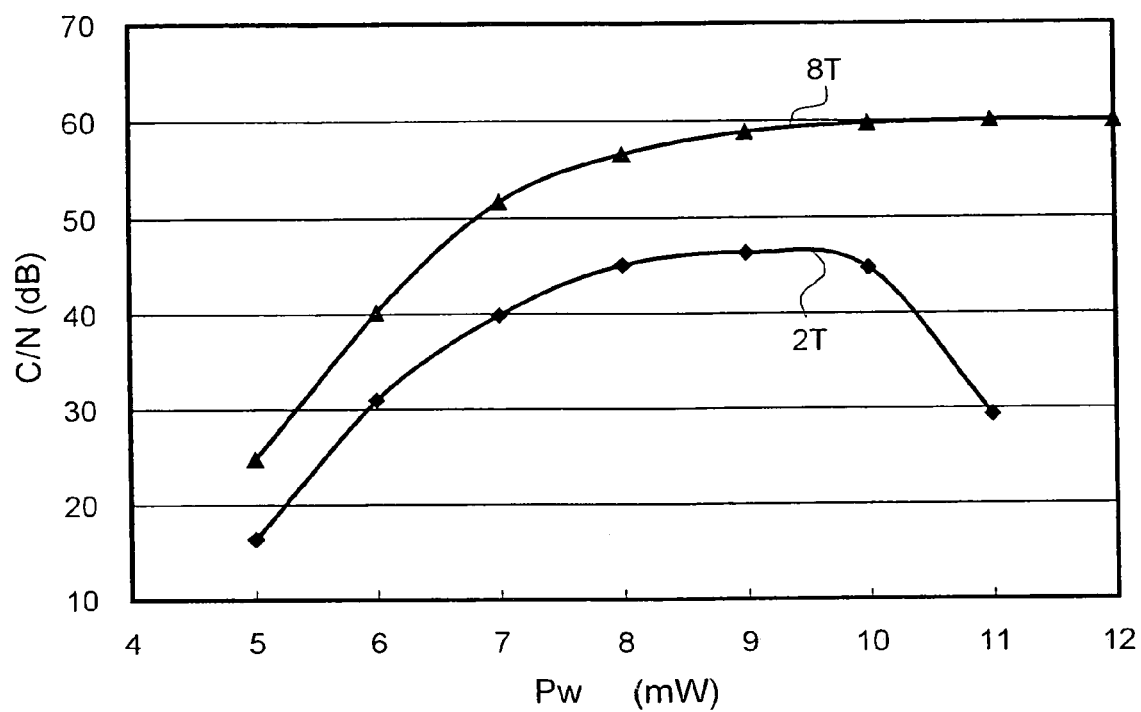
FIG. 18 is a graph showing the results of measuring the relationship between the C/N ratio of a reproduced signal obtained by reproducing a 2T signal and an 8T signal recorded in an L1 layer of an optical recording medium sample #1 and a recording power in Working Example 2.

The results of the measurement are shown in FIG. 18.

As shown in FIG. 18, the recording power Pw of the laser beam at which the C/N ratio of the 2T signal was maximum was 9 mW while the recording power Pw of the laser beam at which the C/N ratio of the 8T signal was maximum was 11 mW and they did not coincide with each other.

Further, it was found that the C/N ratio of the 2T signal obtained when the recording power Pw was set to 9 mW was 46.3 dB and that the C/N ratio of the 8T signal obtained when the recording power Pw was set to 9 mW was 58.9 dB.

On the other hand, it was found that the C/N ratio of the 2T signal obtained when the recording power Pw was set to 11 mW was 29.4 dB and that the C/N ratio of the 8T signal obtained when the recording power Pw was set to 11 mW was 60.1 dB.

Therefore, it was found that the difference between the C/N ratio of the 2T signal obtained when the recording power Pw was set to 11 mW and the C/N ratio of the 2T signal obtained when the recording power Pw was set to 11 mW was 16.9 dB and was extremely large, while the difference between the C/N ratio of the 8T signal obtained when the recording power Pw was set to 9 mW and the C/N ratio of the 8T signal obtained when the recording power Pw was set to 9 mW was 1.2 dB and was very small.

Furthermore, the recording power Pw of the laser beam at which clock jitter of the reproduced 2T signal was minimum and the recording power Pw of the laser beam at which clock jitter of the reproduced 8T signal was minimum were measured. As a result, it was found that each of them was 8.2 mW and the minimum value of clock jitter was 5.4% and that clock jitter of both the reproduced 2T signal and 8T signal was very low.

WORKING EXAMPLE 3

The optical recording medium sample #1 was set in the optical recording medium evaluation apparatus "DDU1000" (Product Name) manufactured by Pulstec Industrial Co., Ltd. and a laser beam having a wavelength λ of 405 nm was focused onto the L0 layer using an objective lens whose numerical aperture was 0.85 via the light transmission layer while the optical recording medium sample #1 was rotated at the linear velocity of 5.3 m/sec, thereby recording a 2T signal and an 8T signal in the L0 layer of the optical recording medium sample #1. Here, the power of the laser beam was modulated using the second pulse train pattern.

The pulse widths of the first pulse train pattern were set so that $t_{top}$ was equal to 0.7T and each of $t_{mp}$ and $t_{lp}$ was equal to 0.5T.

The bottom power thereof was fixed at 0.1 mW while the recording power of the laser beam Pw was varied.

Then, the 2T signal and the 8T signal recorded in the L0 layer of the optical recording medium sample #1 were reproduced using the above mentioned optical recording medium evaluation apparatus and the C/N ratios of the reproduced signals were measured. Here, the power of the laser beam was set to 0.7 mW.

Figure 19:
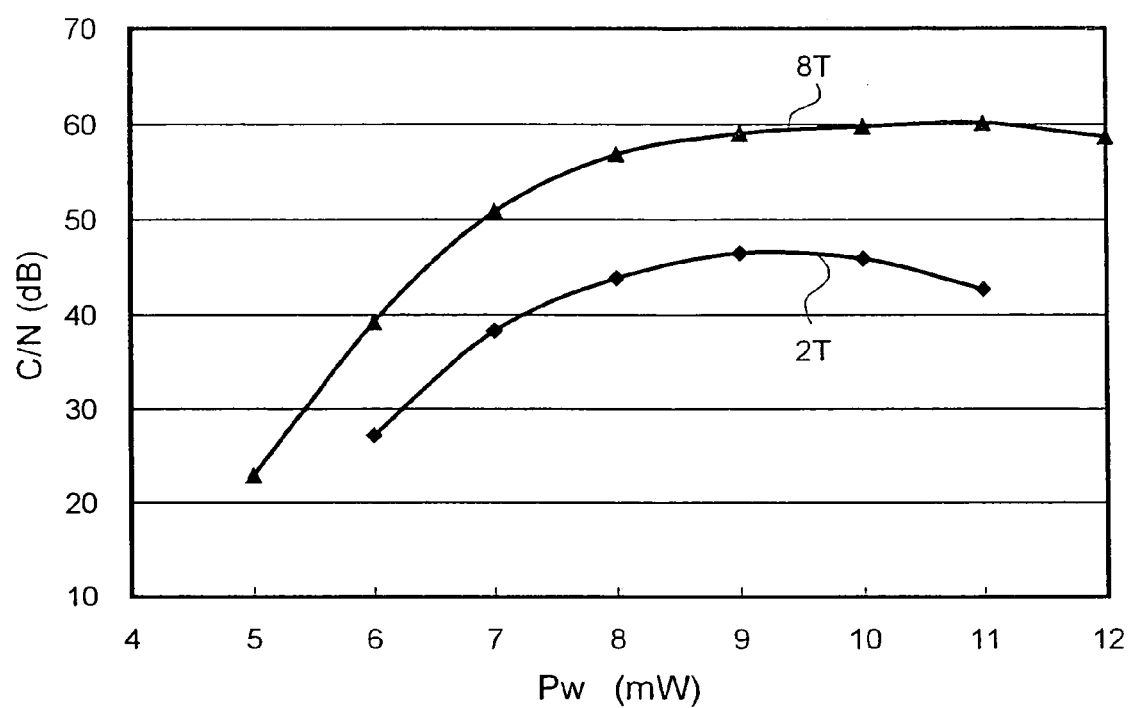
FIG. 19 is a graph showing the results of measuring the relationship between the C/N ratio of a reproduced signal obtained by reproducing a 2T signal and an 8T signal recorded in an L1 layer of an optical recording medium sample #1 and a recording power in Working Example 3.

The results of the measurement are shown in FIG. 19.

As shown in FIG. 19, the recording power Pw of the laser beam at which the C/N ratio of the 2T signal was maximum was 9 mW while the recording power Pw of the laser beam at which the C/N ratio of the 8T signal was maximum was 11 mW and they did not coincide with each other.

Further, it was found that the C/N ratio of the 2T signal obtained when the recording power Pw was set to 9 mW was 46.5 dB and that the C/N ratio of the 8T signal obtained when the recording power Pw was set to 9 mW was 59.1 dB.

On the other hand, it was found that the C/N ratio of the 2T signal obtained when the recording power Pw was set to 11 mW was 42.7 dB and that the C/N ratio of the 8T signal obtained when the recording power Pw was set to 11 mW was 60.2 dB.

Therefore, it was found that the difference between the C/N ratio of the 2T signal obtained when the recording power Pw was set to 11 mW and the C/N ratio of the 2T signal obtained when the recording power Pw was set to 11 mW was 3.8 dB, while the difference between the C/N ratio of the 8T signal obtained when the recording power Pw was set to 9 mW and the C/N ratio of the 8T signal obtained when the recording power Pw was set to 9 mW was 1.1 dB and they were very small.

Furthermore, the recording power Pw of the laser beam at which clock jitter of the reproduced 2T signal was minimum and the recording power Pw of the laser beam at which clock jitter of the reproduced 8T signal was minimum were measured. As a result, it was found that each of them was 8.6 mW and the minimum value of clock jitter was 4.9% and that clock jitter of both the reproduced 2T signal and 8T signal was very low.

WORKING EXAMPLE 4

The optical recording medium sample # 1 was set in the optical recording medium evaluation apparatus "DDU1000" (Product Name) manufactured by Pulstec Industrial Co., Ltd. Then, similarly to in Working Example 3, except that the bottom power Pb of the laser beam was fixed at 2.0 mW, a 2T signal and an 8T signal were recorded in the L1 layer of the optical recording medium sample # 1 and the 2T signal and the 8T signal were reproduced to measure the C/N ratios of the reproduced signals.

Figure 20:
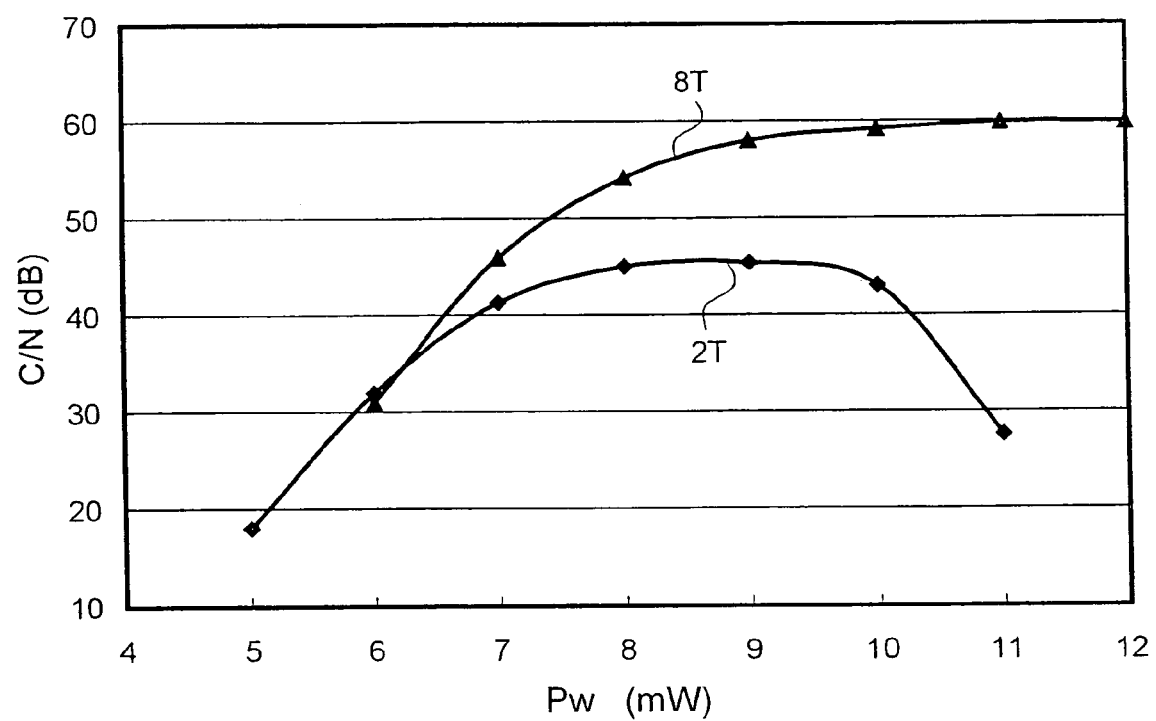
FIG. 20 is a graph showing the results of measuring the relationship between the C/N ratio of a reproduced signal obtained by reproducing a 2T signal and an 8T signal recorded in an L1 layer of an optical recording medium sample #1 and a recording power in Working Example 4.

The results of the measurement are shown in FIG. 20.

As shown in FIG. 20, the recording power Pw of the laser beam at which the C/N ratio of the 2T signal was maximum was 9 mW while the recording power Pw of the laser beam at which the C/N ratio of the 8T signal was maximum was 11 mW and they did not coincide with each other.

Further, it was found that the C/N ratio of the 2T signal obtained when the recording power Pw was set to 9 mW was 45.4 dB and that the C/N ratio of the 8T signal obtained when the recording power Pw was set to 9 mW was 58.0 dB.

On the other hand, it was found that the C/N ratio of the 2T signal obtained when the recording power Pw was set to 11 mW was 27.6 dB and that the C/N ratio of the 8T signal obtained when the recording power Pw was set to 11 mW was 59.9 dB.

Therefore, it was found that the difference between the C/N ratio of the 2T signal obtained when the recording power Pw was set to 11 mW and the C/N ratio of the 2T signal obtained when the recording power Pw was set to 11 mW was 17.8 dB and was extremely large while the difference between the C/N ratio of the 8T signal obtained when the recording power Pw was set to 9 mW and the C/N ratio of the 8T signal obtained when the recording power Pw was set to 9 mW was 1.9 dB and was very small.

Furthermore, the recording power Pw of the laser beam at which clock jitter of the reproduced 2T signal was minimum and the recording power Pw of the laser beam at which clock jitter of the reproduced 8T signal was minimum were measured. As a result, it was found that each of them was 8.2 mW and the minimum value of clock jitter was 4.8% and that clock jitter of both the reproduced 2T signal and 8T signal was very low.

WORKING EXAMPLE 5

The optical recording medium sample # 1 was set in an optical recording medium evaluation apparatus "DDU1000" (Product Name) manufactured by Pulstec Industrial Co., Ltd. and a laser beam having a wavelength λ of 405 nm was focused onto the L1 layer using an objective lens whose numerical aperture was 0.85 via the light transmission layer while the optical recording medium sample # 1 was rotated at a linear velocity of 5.3 m/sec, thereby recording a random signal containing a 2T signal to an 8T signal in the L1 layer of the optical recording medium sample # 1. Here, the power of the laser beam was modulated using the first pulse train pattern.

The pulse widths of the first pulse train pattern were set so that $t_{top}$ was equal to 0.5T, each of $t_{mp}$ and $t_{lp}$ was equal to 0.6T, while $t_{cl}$ was varied.

The intermediate power Pm of the laser beam was fixed at 2.4 mW and the bottom power thereof was fixed at 0.1 mW while the recording power of the laser beam Pw was set so that jitter of a reproduced signal became lowest for each value of $t_{cl}$.

Then, the random signal recorded in the L1 layer of the optical recording medium sample # 1 was reproduced using the above mentioned optical recording medium evaluation apparatus and the C/N ratios of the reproduced signals were measured. Here, the power of the laser beam was set to 0.7 mW.

Figure 21:
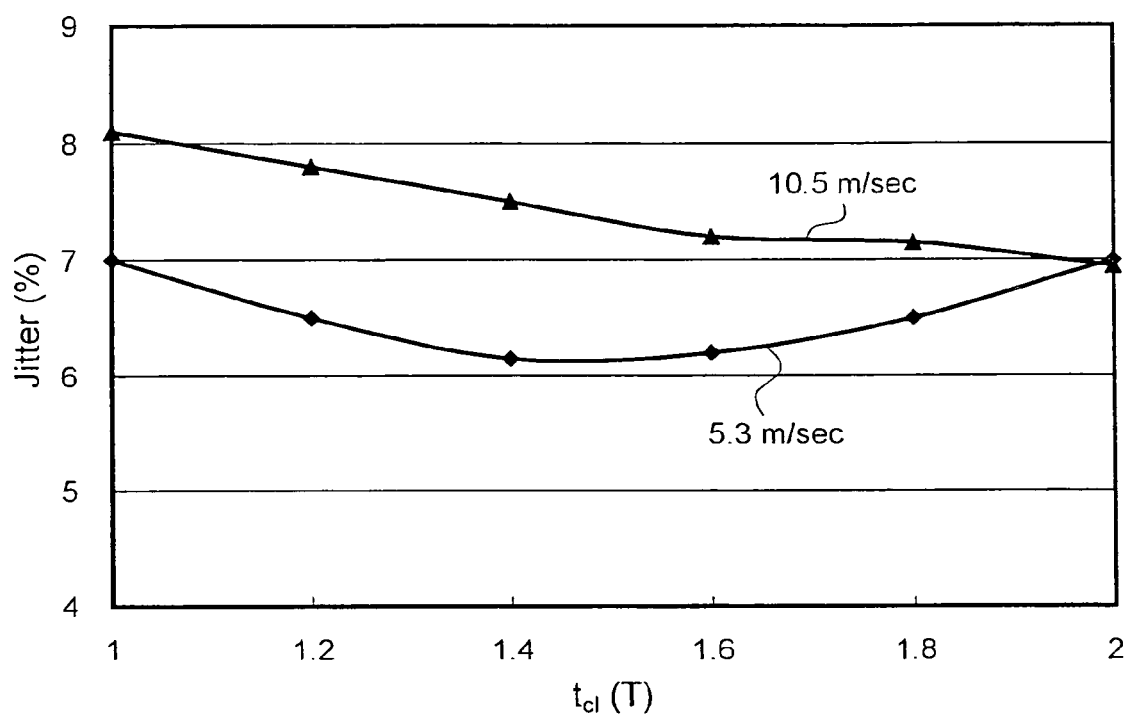
FIG. 21 is a graph showing the results of measuring the relationship between jitter of a reproduced signal obtained by reproducing a random signal recorded in an L1 layer of an optical recording medium sample #1 and a cooling interval $t_{c1}$ in Working Example 5.

The results of the measurement are shown in FIG. 21.

Further, a random signal containing a 2T signal to an 8T signal was recorded in the L1 layer of the optical recording medium sample # 1 in a similar manner, except that the optical recording medium sample # 1 was rotated at a linear velocity of 10.5 m/sec and the random signal was reproduced to measure the C/N ratio of the reproduced signal.

The results of the measurement are shown in FIG. 21.

As shown in FIG. 21, it was found that in the case where a linear recording velocity was set to 10.5 m/sec, jitter of a reproduced signal was improved as $t_{cl}$ was longer and that it was preferable to set $t_{cl}$ to be longer when the linear recording velocity was high.

The present invention has thus been shown and described with reference to a specific embodiment and working examples. However, it should be noted that the present invention is in no way limited to the details of the described arrangements but changes and modifications may be made without departing from the scope of the appended claims.

For example, in the above described embodiment, although the first L0 recording film 23a and the second L0 recording film 23b of the L0 layer 20 are formed in contact with each other it is not absolutely necessary to form the first L0 recording film 23a and the second L0 recording film 23b of the L0 layer 20 in contact with each other but it is sufficient for the second L0 recording film 23b to be so located in the vicinity of the first L0 recording film 23a as to enable Si contained in the first L0 recording film 23a as a primary component and Cu contained in the second L0 recording film 23b as a primary component to mix with each other and form a recording mark M when the region is irradiated with a laser beam. Further, one or more other films such as a dielectric film may be interposed between the first L0 recording film 23a and the second L0 recording film 23b.

Further, in the above described embodiment, although the first L1 recording film 33a and the second L1 recording film 33b of the L1 layer 30 are formed in contact with each other it is not absolutely necessary to form the first L1 recording film 33a and the second L1 recording film 33b of the L1 layer 30 in contact with each other but it is sufficient for the second L1 recording film 33b to be so located in the vicinity of the first L1 recording film 33a as to enable Si contained in the first L1 recording film 33a as a primary component and Cu contained in the second L1 recording film 33b as a primary component to mix with each other and form a recording mark M when the region is irradiated with a laser beam. Further, one or more other films such as a dielectric film may be interposed between the first L1 recording film 33a and the second L1 recording film 33b.

Furthermore, in the above described embodiment, although the L0 layer 20 includes the first L0 recording film 23a and the second L0 recording film 23b, the L0 layer 20 may include one or more recording films containing the same element as a primary component as that contained in the first L0 recording film 23a as a primary component or one or more recording films containing the same element as a primary component as that contained in the second L0 recording film 23b as a primary component, in addition to the first L0 recording film 23a and the second L0 recording film 23b.

Moreover, in the above described embodiment, although the L1 layer 30 includes the first L1 recording film 33a and the second L1 recording film 33b, the L1 layer 30 may include one or more recording films containing the same element as a primary component as that contained in the first L1 recording film 33a as a primary component or one or more recording films containing the same element as a primary component as that contained in the second L1 recording film 33b as a primary component, in addition to the first L1 recording film 33a and the second L1 recording film 33b.

Further, in the above described embodiment, although both the first L0 recording film 23a and the first L1 recording film 33a contain Si as a primary component, it is not absolutely necessary for both the first L0 recording film 23a and the first L1 recording film 33a to contain Si as a primary component and both the first L0 recording film 23a and the first L1 recording film 33a may contain an element selected from the group consisting of Ge, Sn, Mg, In, Zn, Bi and Al instead of Si.

Moreover, in the above described embodiment, although both the second L0 recording film 23b and the second L1 recording film 33b contain Cu as a primary component, it is not absolutely necessary for both the second L0 recording film 23b and the second L1 recording film 33b to contain Cu as a primary component and both the second L0 recording film 23b and the second L1 recording film 33b may contain an element selected from the group consisting of Al, Zn, Ti and Ag instead of Cu.

Furthermore, in the above described embodiment, although the first L0 recording film 23a is disposed on the side of the light transmission layer 13 and the second L0 recording film 23b is disposed on the side of the support substrate 11, it is possible to dispose the first L0 recording film 23a on the side of the support substrate 11 and the second L0 recording film 23b on the side of the light transmission layer 13.

Moreover, in the above described embodiment, although the first L1 recording film 33a is disposed on the side of the light transmission layer 13 and the second L1 recording film 33b is disposed on the side of the support substrate 11, it is possible to dispose the first L1 recording film 33a on the side of the support substrate 11 and the second L1 recording film 33b on the side of the light transmission layer 13.

Further, in the above described embodiment, the L0 layer 20 includes the first L0 recording film 23a containing Si as a primary component and the second L0 recording film 33b containing Cu as a primary component. However, it is not absolutely necessary for the L0 layer 20 to include the first L0 recording film 23a containing Si as a primary component and the second L0 recording film 23b containing Cu as a primary component and the L0 layer 20 may be constituted as a single recording film. Further, the L0 layer 20 which is an information recording layer farthest from the light incidence plane 13a may be formed by pits.

Furthermore, in the above described embodiment, although the L1 layer 30 is not provided with no reflective film, it is not absolutely necessary to form the L1 layer 30 including no reflective film and the L1 layer 30 may be provided with a reflective film thinner than the reflective film 21 included in the L0 layer 20.

Moreover, in the above described embodiment, although the optical recording medium 10 includes the L0 layer 20 and the L1 layer 30 as information recording layers, it is not absolutely necessary for the optical recording medium 10 to include the L0 layer 20 and the L1 layer 30 as information recording layers and the optical recording medium 10 may include three or more information recording layers. In such a case, it is preferable to modulate the power of a laser beam L using the first pulse train pattern when data are to be recorded in information recording layers other than an information recording layer farthest from the light incidence plane 13a but it is not absolutely necessary to modulate the power of a laser beam L using the first pulse train pattern when data are to be recorded in information recording layers other than an information recording layer farthest from the light incidence plane 13a.

Further, in the above described embodiment, although the optical recording medium 10 includes the light transmission layer 13 and is constituted so that a laser beam L is projected onto the L0 layer 20 or the L1 layer 30 via the light transmission layer 13, the optical recording medium according to the present invention is not limited to that having such a configuration and an optical recording medium may include a substrate formed of a light transmissible material, a protective layer and an L0 layer 20 and an L1 layer 20 between the substrate and the protective layer and be constituted so that a laser beam is projected onto the L0 layer 20 or the L1 layer 30 via the substrate.

Furthermore, in the above described embodiment, although a laser beam L having a wavelength of 380 nm to 450 nm is employed for recording data in the optical recording medium 10, it is not absolutely necessary to use a laser beam L having a wavelength of 380 nm to 450 nm.

Moreover, in the above described embodiment, in the case where data are to be recorded in the L0 layer 20 of the optical recording medium 10, the power of the laser beam L is modulated using the first pulse train pattern or the second pulse train pattern. However, it is not absolutely necessary to modulate the power of the laser beam L using the first pulse train pattern or the second pulse train pattern when data are to be recorded in the L0 layer 20 which is the information recording layer farthest from the light incidence plane 13a and the power of the laser beam L may be modulated using a pulse train pattern other than the first pulse train pattern and the second pulse train.

Further, in the above described embodiment, although (n−1) recording pulses are used for forming a recording mark in the first pulse train pattern, it is not absolutely necessary to use (n−1) recording pulses for forming a recording mark. In the case of employing the 1,7RLL Modulation Code, it is possible to use n recording pulses, thereby forming a recording mark, and in the case of employing the 8/16 Modulation Code, it is possible to use (n−1) recording pulses, thereby forming a recording mark. Furthermore, in the case of employing the 1,7RLL Modulation Code, n/2 recording pulses may be used for recording a 2T signal, a 4T signal, a 6T signal or an 8T signal and (n−1)/2 recording pulses may be used for recording a 3T signal, a 5T signal or a 7T signal.

Moreover, in the above described embodiment, the first pulse train pattern is constituted so as to modulate the power of the laser beam L between three levels, it is not absolutely necessary for the first pulse train pattern to be constituted so as to modulate the power of the laser beam L between three levels and the first pulse train pattern may be constituted so as to modulate the power of the laser beam L between four or more levels.

According to the present invention, it is possible to provide a method for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner.

Further, according to the present invention, it is possible to provide an apparatus for recording data in an optical recording medium which can record data in information recording layers other than an information recording layer farthest from a light incidence plane of an optical recording medium including a plurality of information recording layers in a desired manner and reproduce data from information recording layers other than the information recording layer farthest from the light incidence plane in a desired manner.

Furthermore, according to the present invention, it is possible to provide an optical recording medium which includes a plurality of information recording layers and can record data in information recording layers other than an information recording layer farthest from a light incidence plane thereof in a desired manner and reproduce data from information recording layers other than the information recording layer farthest from the light incidence plane in a desired manner.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for recording data in an optical recording medium wherein the optical recording medium includes a substrate, a protective layer and a plurality of information recording layers between the substrate and the protective layer, the method for recording data in an optical recording medium comprising:

projecting a laser beam onto the plurality of information recording layers whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane; and forming a recording mark in the at least one information recording layer other than the recording layer farthest from the light incidence plane, thereby recording data therein, wherein the power of the laser beam is set to the bottom power when it is projected onto the end potion of each of the recording marks, and, wherein the power of the laser beam is modulated so that a time period during which the power of the laser beam is set to the bottom power for forming the end portion of each of the recording marks becomes longer as a linear recording velocity is higher.

2. A method for recording data in an optical recording medium in accordance with claim 1, wherein the level of the bottom power is set so that a region of the at least one information recording layer other than the information recording layer farthest from the light incidence plane heated by irradiation with the laser beam whose power is set to the be cooled during irradiation with the laser beam whose power is set at the bottom power.

3. A method for recording data in an optical recording medium in accordance with claim 1, wherein the power of the laser beam is set to the intermediate power when it is projected onto a region between neighboring recording marks to be formed in the at least one information recording layer other than the information recording layer farthest from the light incidence plane.

4. A method for recording data in an optical recording medium in accordance with claim 2, wherein the power of the laser beam is set to the intermediate power when it is projected onto a region between neighboring recording marks to be formed in the at least one information recording layer other than the information recording layer farthest from the light incidence plane.

5. A method for recording data in an optical recording medium in accordance with claim 1, wherein data are recorded by employing an objective lens and a laser beam whose numerical aperture NA and wavelength $\lambda$ satisfy $\lambda/NA \leq 640$ nm, and projecting the laser beam onto the optical recording medium via the objective lens.

6. A method for recording data in an optical recording medium in accordance with claim 2, wherein data are recorded by employing an objective lens and a laser beam whose numerical aperture NA and wavelength $\lambda$ satisfy $\lambda/NA \leq 640$ nm, and projecting the laser beam onto the optical recording medium via the objective lens.

7. A method for recording data in an optical recording medium in accordance with claim 1, wherein the protective layer is formed of a light transmissible material and the laser beam is projected onto the plurality of the information recording layers via the protective layer.

8. A method for recording data in an optical recording medium in accordance with claim 2, wherein the protective layer is formed of a light transmissible material and the laser beam is projected onto the plurality of the information recording layers via the protective layer.

9. An apparatus for recording data in an optical recording medium wherein the optical recording medium includes a substrate, a protective layer and a plurality of information recording layers between the substrate and the protective layer and a laser beam is projected onto the plurality of information recording layers via a light incidence plane constituted by either the substrate or the protective layer, thereby recording data in the plurality of information recording layers, the apparatus for recording data in an optical recording medium being constituted so as to project a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane and form a recording mark in the at least one information recording layer other than the information recording layer farthest from the light incidence plane, thereby recording data therein, wherein the power of the laser beam is set to the bottom power when it is projected onto the end portion each of the recording marks, and wherein the power of the laser beam is modulated so that a time period during which the power of the laser beam is set to the bottom power for forming the end portion of each of the recording marks becomes longer as a linear recording velocity is higher.

10. An optical recording medium which includes a substrate, a protective layer and a plurality of information recording layers between the substrate and the protective layer and is constituted so that a laser beam is projected onto the plurality of information recording layers via a light incidence plane constituted by either the substrate or the protective layer, thereby recording data in the plurality of information recording layers, the optical recording medium being recorded with first data for setting data recording conditions necessary for projecting a laser beam whose power is modulated between at least three levels including a level corresponding to a recording power, a level corresponding to an intermediate power lower than the recording power and a level corresponding to a bottom power lower than the intermediate power onto at least one information recording layer other than an information recording layer farthest from the light incidence plane when a recording mark is to be formed in the at least one information recording layer other than an information recording layer farthest from the light incidence plane, thereby recording data therein, wherein the optical recording medium is further recorded with second data for setting data recording conditions necessary for setting of the laser beam to the bottom power when it is projected onto the end portion of each of the recording marks and modulating the power of the laser beam so that a time period during which the power of the laser beam is set to the bottom power for forming the end potion of each of the recording marks becomes longer as a linear recording velocity is higher.

11. An apparatus for recording data in an optical recording medium in accordance with claim 9, wherein the level of the bottom power is set so that a region of the at least one information recording layer other than the information recording layer farthest from the light incidence plane heated by irradiation with the laser beam whose power is set to the recording power can be cooled during irradiation with the laser beam whose power is set at the bottom power.

12. An apparatus for recording data in an optical recording medium in accordance with claim 9, wherein the power of the laser beam is set to the intermediate power when it is projected onto a region between neighboring recording marks to be formed in the at least one information recording layer other than the information recording layer farthest from the light incidence plane.

13. An apparatus for recording data in an optical recording medium in accordance with claim 11, wherein the power of the laser beam is set to the intermediate power when it is projected onto a region between neighboring recording marks to be formed in the at least one information recording layer other than the information recording layer farthest from the light incidence plane.

14. An apparatus for recording data in an optical recording medium in accordance with claim 9, wherein data are recorded by employing an objective lens and a laser beam whose numerical aperture NA and wavelength $\lambda$ satisfy $\lambda/NA \leq 640$ nm, and projecting the laser beam onto the optical recording medium via the objective lens.

15. An apparatus for recording data in an optical recording medium in accordance with claim 11, wherein data are recorded by employing an objective lens and a laser beam whose numerical aperture NA and wavelength $\lambda$ satisfy $\lambda/NA \leq 640$ nm, and projecting the laser beam onto the optical recording medium via the objective lens.

16. An optical recording medium in accordance with claim 10, which is further recorded with third data for setting data recording conditions necessary for setting the level of the bottom power so that a region of the at least one information recording layer other than the information recording layer farthest from the light incidence plane heated by irradiation with the laser beam whose power is set to the recording power can be cooled during irradiation with the laser beam whose power is set at the bottom power.

17. An optical recording medium in accordance with claim 10, which is further recorded with third data for setting data recording conditions necessary for setting the power of the laser beam to the intermediate power when it is projected onto a region between neighboring recording marks to be formed in the at least one information recording layer other than the information recording layer farthest from the light incidence plane.

18. An optical recording medium in accordance with claim 16, which is further recorded with third data for setting data recording conditions necessary for setting the power of the laser beam to the intermediate power when it is projected onto a region between neighboring recording marks to be formed in the at least one information recording layer other than the information recording layer farthest from the light incidence plane.

19. An optical recording medium in accordance with claim 10, wherein the protective layer is formed of a light transmissible material and the laser beam is projected onto the plurality of the information recording layers via the protective layer.

20. An optical recording medium in accordance with claim 16, wherein the protective layer is formed of a light transmissible material and the laser beam is projected onto the plurality of the information recording layers via the protective layer.

* * * * *